United States Patent
Warabiminami

(10) Patent No.: US 11,634,636 B2
(45) Date of Patent: Apr. 25, 2023

(54) METHOD FOR MANUFACTURING RESIN THIN FILM STRIPPED PIECES

(71) Applicant: ZEON CORPORATION, Tokyo (JP)

(72) Inventor: Yusuke Warabiminami, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 27 days.

(21) Appl. No.: 16/982,124

(22) PCT Filed: Mar. 26, 2019

(86) PCT No.: PCT/JP2019/012980
§ 371 (c)(1),
(2) Date: Sep. 18, 2020

(87) PCT Pub. No.: WO2019/189246
PCT Pub. Date: Mar. 10, 2019

(65) Prior Publication Data
US 2021/0115336 A1 Apr. 22, 2021

(30) Foreign Application Priority Data

Mar. 30, 2018 (JP) .............................. JP2018-069667

(51) Int. Cl.
*C09K 19/04* (2006.01)
*B42D 25/328* (2014.01)
(Continued)

(52) U.S. Cl.
CPC ............ *C09K 19/04* (2013.01); *B29C 59/026* (2013.01); *B42D 25/328* (2014.10);
(Continued)

(58) Field of Classification Search
None
See application file for complete search history.

(56) References Cited

U.S. PATENT DOCUMENTS 5,059,245 A * 10/1991 Phillips .................. C09D 11/50
106/31.65
5,364,557 A * 11/1994 Faris ....................... B29C 71/00
252/299.01
(Continued)

FOREIGN PATENT DOCUMENTS

| CN | 102582250 A | 7/2012 |
| JP | H0672962 A | 3/1994 |

(Continued)

OTHER PUBLICATIONS

Oct. 6, 2020, International Preliminary Report on Patentability issued in the International Patent Application No. PCT/JP2019/012980.

*Primary Examiner* — James M Mellott
(74) *Attorney, Agent, or Firm* — Kenja IP Law PC

(57) ABSTRACT

A method for producing flakes of a resin thin film including: a step (1) of forming a resin thin film on a substrate film to obtain a multilayer film; a step (2) of pressing the multilayer film by a member having a concavo-convex shape to form cracks in the resin thin film; and a step (3) of stripping the resin thin film from the substrate film to obtain flakes. The step (2) is preferably performed with a pressing pressure of 100 MPa or less. The resin thin film is preferably formed of a cured product of a photocurable liquid crystal composition. The resin thin film is preferably a cholesteric resin layer.

7 Claims, 11 Drawing Sheets

(51) Int. Cl.
*B42D 25/364* (2014.01)
*B29C 59/02* (2006.01)
*C09B 67/00* (2006.01)
*G02F 1/1335* (2006.01)

(52) U.S. Cl.
CPC ........ B42D 25/364 (2014.10); C09B 67/0098 (2013.01); C09B 68/485 (2013.01); G02F 1/133536 (2013.01); *B29C 2793/009* (2013.01); *C09K 2019/0448* (2013.01); *C09K 2219/03* (2013.01)

(56) References Cited

U.S. PATENT DOCUMENTS

| | | | |
|---|---|---|---|
| 6,217,792 B1 | 4/2001 | Parri et al. | |
| 6,468,444 B1 | 10/2002 | Meyer et al. | |
| 6,879,362 B2 | 4/2005 | Kawabata | |
| 2002/0017633 A1 | 2/2002 | Goulding et al. | |
| 2005/0126414 A1* | 6/2005 | Weiss | B41M 5/025 101/491 |
| 2010/0059709 A1* | 3/2010 | Bachels | C09K 19/3804 252/299.6 |
| 2011/0182805 A1* | 7/2011 | DeSimone | G03F 7/0002 424/9.4 |
| 2012/0169809 A1 | 7/2012 | Tsuchiya | |

FOREIGN PATENT DOCUMENTS

| | | |
|---|---|---|
| JP | 2000290315 A | 10/2000 |
| JP | 2001261739 A | 9/2001 |
| JP | 2003066214 A | 3/2003 |
| JP | 2003313187 A | 11/2003 |
| JP | 2003342219 A | 12/2003 |
| JP | 2004115414 A | 4/2004 |
| JP | 2005289881 A | 10/2005 |
| JP | 2007176870 A | 7/2007 |
| WO | 9800428 A1 | 1/1998 |

* cited by examiner

METHOD FOR MANUFACTURING RESIN THIN FILM STRIPPED PIECES

FIELD

The present invention relates to a method for producing flakes of a resin thin film.

BACKGROUND

There have been known in prior art techniques that use small pieces, obtained by pulverizing a resin thin film, as a pigment. Such a pigment is generally produced by forming a resin thin film on a substrate film, stripping the resin thin film from the substrate film, and then pulverizing the stripped resin thin film (see Patent Literature 1).

CITATION LIST

Patent Literature

Patent Literature 1: Japanese Patent Application Laid-Open No. 2001-261739 A (Corresponding Publication: U.S. Patent Application Publication No. 2002/017633)

SUMMARY

Technical Problem

However, such a prior art method has a problem in which it is difficult to efficiently perform the process of stripping a resin thin film from a substrate film.

As a method for solving such a problem, a method has been studied in which a substrate film having a resin thin film is folded to form cracks, and then the resin thin film is stripped from the substrate film to produce flakes of the resin thin film. Such a producing method can efficiently produce flakes, but flakes having a large particle size may be mixed.

It is therefore an object of the present invention to provide a method for producing flakes of a resin thin film formed on a substrate film, the method being capable of efficiently producing flakes having a sharper particle size distribution than those in prior art.

Solution to Problem

The present inventor has intensively studied to achieve the foregoing object, and as a result, has found that flakes having a sharper particle size distribution than those in prior art can efficiently be produced by forming cracks in a resin thin film by pressing with a member having a concavo-convex shape before stripping the resin thin film. This finding has led to the completion of the present invention.

Specifically, the present invention is as follows.

<1> A method for producing flakes of a resin thin film comprising:
  a step (1) of forming a resin thin film on a substrate film to obtain a multilayer film;
  a step (2) of pressing the multilayer film by a member having a concavo-convex shape to form cracks in the resin thin film; and
  a step (3) of stripping the resin thin film from the substrate film to obtain flakes.
<2> The method for producing flakes of a resin thin film according to <1>, wherein the step (2) is performed with a pressing pressure of 100 MPa or less.
<3> The method for producing flakes of a resin thin film according to <1> or <2>, wherein the resin thin film is formed of a cured product of a photocurable liquid crystal composition.
<4> The method for producing flakes of a resin thin film according to any one of <1> to <3>, wherein the resin thin film is a cholesteric resin layer.
<5> The method for producing flakes of a resin thin film according to any one of <1> to <4>, wherein
  the step (3) includes:
  a step (3A) of spraying a fluid onto a portion of the resin thin film where the cracks have been formed to blow away the resin thin film having the cracks formed therein;
  a step (3B) of collecting the blown resin thin film; and
  a step (3C) of pulverizing the collected resin thin film.

Advantageous Effects of Invention

According to the present invention, it is possible to provide a method for producing flakes of a resin thin film formed on a substrate film, the method being capable of efficiently producing flakes having a sharper particle size distribution than those in prior art.

DESCRIPTION OF EMBODIMENTS

Hereinafter, the present invention will be described in detail with reference to embodiments and examples. However, the present invention is not limited to the following embodiments, and may be freely modified for implementation without departing from the scope of claims of the present invention and the scope of their equivalents.

In the following description, a "long-length" film refers to a film with the length that is about 5 times or more the width of the film, and preferably a film with the length that is 10 times or more the width, and specifically refers to a film having a length that allows a film to be wound up into a rolled shape for storage or transportation. The upper limit of the length of the long-length film is not particularly limited, and may be, for example, 100,000 times a width.

In the following description, a direction of an element being "parallel", "perpendicular" or "orthogonal" may allow an error within the range of not impairing the advantageous effects of the present invention, for example, within a range of ±5°, unless otherwise specified. A direction being "along" a certain direction means a direction being "parallel" to the certain direction.

In the following description, "(meth)acryl" encompasses acryl, methacryl, and a combination thereof. "(Meth)acrylate" encompasses acrylate, methacrylate, and a combination thereof. "(Thio)epoxy" encompasses epoxy, thioepoxy, and a combination thereof. "Iso(thio)cyanate" encompasses isocyanate, isothiocyanate, and a combination thereof.

First Embodiment: Method for Producing Flakes of Resin Thin Film

1. Summary of Method for Producing Flakes of Resin Thin Film

Hereinbelow, a method for producing flakes of a resin thin film according to a first embodiment of the present invention will be described with reference to FIGS. 1 to 11.

The method for producing flakes of a resin thin film according to the present embodiment includes: a step (1) of forming a resin thin film on a substrate film to obtain a multilayer film; a step (2) of pressing the multilayer film by a member(s) having a concavo-convex shape to produce cracks in the resin thin film; and a step (3) of stripping the resin thin film from the substrate film to obtain flakes.

Figure 1:
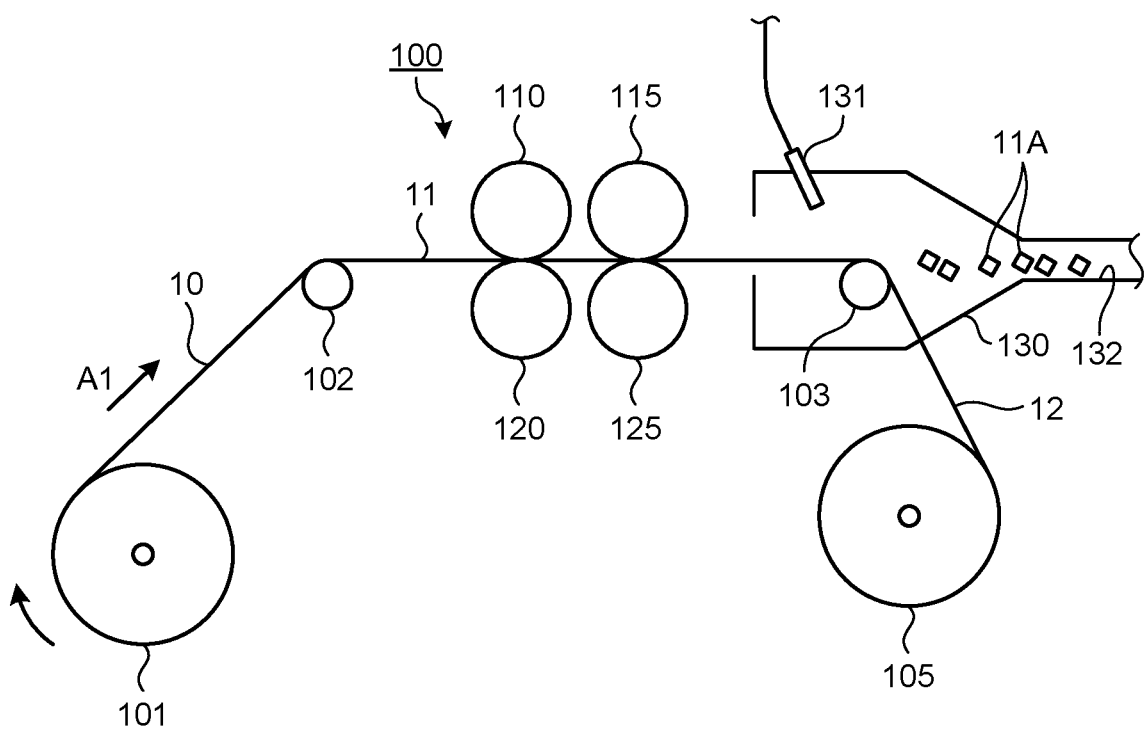
FIG. 1 is a side view schematically showing an apparatus used in a method for producing flakes of a resin thin film according to a first embodiment.
Figure 2:
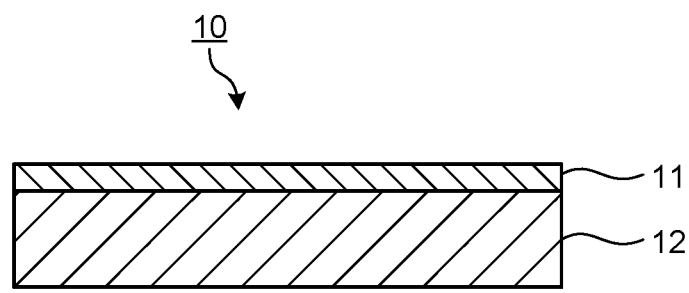
FIG. 2 is a cross-sectional view of a multilayer film used in the producing method according to the first embodiment.

FIG. 1 is a side view schematically showing a production apparatus used in the method for producing flakes of a resin thin film according to the first embodiment of the present invention. This production apparatus is an apparatus that performs the steps (2) and (3) out of the steps (1) to (3) of the producing method according to the present invention. FIG. 2 is a cross-sectional view of a multilayer film used in the present embodiment.

As shown in FIG. 1, an apparatus 100 for producing flakes of a resin thin film used in the present embodiment includes: an unwinding device 101 that unwinds a multilayer film 10; members 110 and 115 having a concavo-convex shape used to press the multilayer film 10 to form cracks; a stripping device 130 that strips a resin thin film from the multilayer film 10; and a substrate film recovery unit 105 that recovers a substrate film 12 from which the resin thin film has been stripped.

The unwinding device 101 is a device for sending the multilayer film 10 produced in the step (1) at a desired sending speed. A film roll obtained by winding up the multilayer film 10 in its lengthwise direction can be loaded onto the unwinding device 101. The unwinding device 101 has a structure capable of sending the multilayer film 10 from the loaded film roll toward the lengthwise direction.

As shown in FIG. 2, the multilayer film 10 includes a substrate film 12 and a resin thin film 11 formed on the substrate film. In FIG. 1, when the multilayer film 10 unwound from the unwinding device 101 is transferred to the stripping device 130, the surface thereof on the side of the resin thin film 11 faces upward.

The multilayer film 10 unwound from the unwinding device 101 is transferred in a direction A1 by a transfer roll 102 to the member 110 having a concavo-convex shape. The transferred multilayer film 10 is pressed by being sandwiched between the member 110 having a concavo-convex shape and a supporting member 120 so that cracks are formed in the resin thin film 11, and is further pressed by being sandwiched between the member 115 having a concavo-convex shape and a supporting member 125 so that cracks are formed in the resin thin film 11 (step (2)).

The multilayer film 10 having cracks formed therein is transferred to the stripping device 130. In the stripping device 130, the resin thin film 11 is stripped from the substrate film 12 to obtain flakes 11A (step (3)).

In the present embodiment, in the stripping device 130, a fluid is sprayed from a nozzle 131 onto an area of the resin thin film 11 where cracks have been formed to blow away the resin thin film 11 having cracks (flakes 11A) formed therein (step (3A)). The resin thin film 11 (flakes 11A) blown away in such a manner is transferred to a collection path 132 and collected (step (3B)). The collected resin thin film 11 (flakes 11A) may be subjected to a pulverizing step depending on the use application (step (3C)). In the present invention, the step (3A), the step 3(B), and the step 3(C) are optional steps.

Hereinbelow, each of the steps will be described in detail.

2. Step (1)

The step (1) is a step of forming a resin thin film on a substrate film to obtain a multilayer film. In the step (1), the multilayer film may be produced by applying a resin-containing composition for forming a resin thin film onto a substrate film to provide a film of the composition and then curing the film of the composition to form a resin thin film. Hereinbelow, materials used in the step (1) and operations in the step (1) will be described.

[2.1. Substrate Film]

The substrate film used to produce the multilayer film is a film for supporting the resin thin film. This substrate film is preferably a film having high mechanical strength to the extent that it does not break in the step (2) in which cracks are formed in a resin thin film. Further, the substrate film is preferably a long-length film from the viewpoint of enabling efficient production by a roll-to-roll method.

As such a substrate film, a film including a substrate layer formed of a resin may be used. Examples of polymers included in the resin forming the substrate layer may include a chain olefin polymer, a cycloolefin polymer, a polycarbonate, a polyester, a polysulfone, a polyethersulfone, a polystyrene, a polyvinyl alcohol, a cellulose acetate-based polymer, a polyvinyl chloride, and a polymethacrylate.

Herein, as the resin, one type thereof may be solely used, and two or more types thereof may also be used in combination at any ratio. The resin may contain an optional compounding agent as long as the advantageous effects of the present invention are not significantly impaired.

The substrate film may be a film having a single layer structure including only one layer, or may be a film having a multilayer structure including two or more layers. Accordingly, the substrate film may be a film including only the substrate layer, or may be a film including an optional layer in addition to the substrate layer.

For example, when a liquid crystal composition is used as a composition for forming a resin thin film, the substrate film may have an orientation film from the viewpoint of achieving good orientation of the liquid crystal composition. The orientation film may be formed of, for example, a resin containing a polymer such as a polyimide, a polyvinyl alcohol, a polyester, a polyarylate, a polyamideimide, a polyetherimide, or a polyamide. As these polymers, one type thereof may be solely used, and two or more types thereof may also be used in combination at any ratio. The orientation film may be produced by applying a solution containing the polymer, drying it, and subjecting the product to a rubbing treatment.

The thickness of the orientation film is preferably 0.01 μm or more, and more preferably 0.05 μm or more, and is preferably 5 m or less, and more preferably 1 m or less.

In the case of imparting the orientation regulating force to the substrate film, the substrate film may have an orientation film in addition to the substrate layer, or may be a film without any orientation film. For example, the substrate layer may directly be subjected to a rubbing treatment to obtain a substrate film having an orientation regulating force.

The substrate film may be an unstretched film not having been subjected to stretching treatment. Alternatively the substrate film may be a stretched film having been subjected to stretching treatment.

The substrate film may be an isotropic film, or an anisotropic film.

Further, the substrate film may have one surface or both surfaces thereof having been subjected to a surface treatment. By subjecting the surface(s) to a surface treatment, the adhesiveness to another layer directly formed on the surface of the substrate film can be improved. Examples of the surface treatment may include an energy ray irradiation treatment and a chemical treatment.

The thickness of the substrate film is preferably 1 μm or more, and more preferably 5 μm or more, and is preferably 500 μm or less, and more preferably 200 μm or less, from the viewpoint of handling property at the time of production, cost of materials, thinning, and weight reduction.

[2.2. Resin Thin Film]

The resin thin film is a film formed on the surface of the substrate film using a resin. The resin thin film may be formed directly on the surface of the substrate film. Another layer may be provided between the substrate film and the resin thin film. The resin thin film may be a film having a single layer structure having only one layer or a film having a multilayer structure having two or more layers.

As to the resin thin film, from the viewpoint of easily peeling the resin thin film from the substrate film, it is preferable that the peel strength of the resin thin film with respect to the substrate film is small. The specific peel strength between the substrate film and the resin thin film is preferably 500 N/m or less, more preferably 100 N/m or less, and more preferably 10 N/m or less. There is no particular limitation on the lower limit, and the lower limit thereof is usually 1 N/m or more.

Herein, the peel strength between the substrate film and the resin thin film may be measured by the following method.

A glass plate is prepared. In addition, a tackiness sheet having a three-layer structure in which a release liner as a protective film, a tackiness agent layer, and a release liner are included in this order is prepared.

The tackiness sheet is cut to have the same size as that of the glass plate. One of the release liners of the tackiness sheet is peeled off to expose the surface of the tackiness agent layer. The exposed surface of the tackiness agent layer is bonded to the glass plate using a roller with a load of 1 Kg.

The other release liner of the tackiness sheet is peeled off to expose the surface of the tackiness agent layer. The exposed surface of the tackiness agent layer is bonded to the surface of the multilayer film including the substrate film and the resin thin film on the resin thin film side using a roller with a load of 1 Kg. After that, a portion of the multilayer film protruding from the glass plate is cut off. As a result, a sample including the glass plate, the tackiness agent layer, the resin thin film, and the substrate film in this order is obtained.

The sample is nipped and fixed with a jig of a tensile tester (for example, "MX-500N-L550-E" manufactured by IMADA Co., Ltd.). The substrate film of this sample is pulled in the direction of 90° (i.e., in the direction normal to the surface of the glass plate) in accordance with JIS K6854-1, thereby peeling off the substrate film from the resin thin film to measure the peel strength of the resin thin film. The tensile speed at the time of measurement is set to 20 mm/min.

The thickness of the resin thin film is preferably 0.1 μm or more, more preferably 1 μm or more, and particularly preferably 2 μm or more, and is preferably 200 μm or less, more preferably 100 μm or less, and particularly preferably 10 μm or less. By setting the thickness of the resin thin film to be equal to or more than the lower limit value, it is possible to prevent breakage of the substrate film when forming cracks. By setting the thickness of the resin thin film to be equal to or less than the upper limit value, it is possible to efficiently perform the peeling operation.

As the resin thin film, for example, a film formed of a cured product obtained by curing a photocurable liquid crystal composition as a composition containing a resin may be used. That is, as the resin forming the resin thin film, for example, a cured product of a photocurable liquid crystal composition may be used. The cured product of the photocurable liquid crystal composition is relatively brittle and tends to be easily broken by stress. Therefore, the film formed of the cured product of the photocurable liquid crystal composition is suitable for the above-mentioned method for producing flakes. For the sake of convenience, materials referred to herein as "liquid crystal compositions"

encompass not only a mixture of two or more substances, but also a material composed of a single substance.

As the resin thin film, for example, a cholesteric resin layer may be used. The cholesteric resin layer means a resin layer having cholesteric regularity. The cholesteric regularity that the resin layer having cholesteric regularity has is a structure in which the molecular axes in one plane are aligned in a certain direction, and the direction of the molecular axes in the subsequent plane that is stacked on the previous plane is shifted slightly at a certain angle, and the angle in the still subsequent plane is further shifted, and in this manner the angles of the molecular axes in the stacked planes are shifted (twisted) as the stacked planes are sequentially observed. That is, when the molecules in the layer have cholesteric regularity, the molecules align in the resin layer in a fashion in which there are a large number of molecular layers. In one layer A among such a large number of molecular layers, the molecules align such that the axes of the molecules are directed in a certain direction. In the layer B adjacent thereto, the molecules align in a direction that is angularly shifted from the direction in the layer A, and in the further adjacent layer C, the molecules align in a direction that is angularly shifted from the direction in the layer B. In this way, in a large number of molecular layers, the angles of the axes of the molecules are continuously shifted to form a structure in which the molecules are twisted. Such a structure in which the direction of the molecular axis is twisted becomes an optically chiral structure.

The cholesteric resin layer usually has a circularly polarized light separating function. That is, the layer has a property that allows one of clockwise circularly polarized light and counterclockwise circularly polarized light to pass therethrough, and part or all of the other circularly polarized light to be reflected. Reflection of circularly polarized light in the cholesteric resin layer is achieved while maintaining its chirality. The cholesteric resin layer preferably has a reflectance as high as possible, and as a result, has a high average reflectance in the wavelength range to be reflected. Thus, when the flakes of the resin thin film are used as the material of an anticounterfeit article, the verification of authenticity becomes clear. Further, when the flakes of the resin thin film are used as the material of a decorative article, the degree of freedom of design can be enhanced.

The wavelength at which the circularly polarized light separating function is exerted generally depends on the pitch of the helical structure in the cholesteric resin layer. The pitch of the helical structure is the distance in the plane normal direction in the helical structure from an original plane to another plane in which the angle of the direction of the molecular axis that has been gradually and continuously shifted as proceeding through the planes from the original plane returns to the original molecular axis direction again. By changing the size of the pitch of the helical structure, it is possible to change the wavelength at which the circularly polarized light separating function is exerted. Examples of the cholesteric resin layer capable of exerting the circularly polarized light separating function in a wide wavelength range may include (i) a cholesteric resin layer in which the size of pitch of the helical structure is changed stepwise, and (ii) a cholesteric resin layer in which the size of pitch of the helical structure is continuously changed.

When the cholesteric resin layer as described above is used as the resin thin film, flakes of the resin thin film that are capable of exerting the circularly polarized light separating function can be efficiently produced by the producing method of the present embodiment.

Hereinafter, as an example of a suitable resin thin film, a cholesteric resin layer formed of a cured product of a photocurable liquid crystal composition will be described. Such a cholesteric resin layer may be obtained, for example, by providing a film of a photocurable liquid crystal composition on a substrate film and curing the film of the liquid crystal composition. In this case, as the liquid crystal composition, for example, a composition containing a liquid crystal compound and capable of exhibiting a cholesteric liquid crystal phase when a film is formed on a substrate film may be used.

Herein, as the liquid crystal compound included in the liquid crystal composition, a polymerizable liquid crystal compound may be used. Such a polymerizable liquid crystal compound in a state where the compound exhibits cholesteric regularity is polymerized to cure the film of the liquid crystal composition, whereby a non-liquid crystal cholesteric resin layer which is cured while exhibiting cholesteric regularity can be obtained.

Suitable examples of such a liquid crystal composition may include a liquid crystal composition containing a compound represented by the following formula (1) and a specific rod-shaped liquid crystal compound.

$$R^1\text{-}A^1\text{-}B\text{-}A^2\text{-}R^2 \qquad (1)$$

In the formula (1), $R^1$ and $R^2$ are each independently a group selected from the group consisting of a linear or branched alkyl group of 1 to 20 carbon atoms, a linear or branched alkylene oxide group of 1 to 20 carbon atoms, a hydrogen atom, a halogen atom, a hydroxyl group, a carboxyl group, a (meta)acrylic group which may be with an optional intervening linking group, an epoxy group, a mercapto group, an isocyanate group, an amino group, and a cyano group.

The alkyl group and alkylene oxide group may be unsubstituted or substituted with one or more halogen atoms. The halogen atom, hydroxyl group, carboxyl group, (meth)acrylic group, epoxy group, mercapto group, isocyanate group, amino group, and cyano group may be bonded to an alkyl group of 1 to 2 carbon atoms and an alkylene oxide group.

Preferable examples of $R^1$ and $R^2$ may include a halogen atom, a hydroxyl group, a carboxyl group, a (meth)acrylic group, an epoxy group, a mercapto group, an isocyanate group, an amino group, and a cyano group.

Preferably, at least one of $R^1$ and $R^2$ is a reactive group. When the compound represented by the above-described formula (1) has a reactive group as at least one of R and $R^2$, the compound is fixed in the cholesteric resin layer at the time of curing, whereby a more rigid layer can be formed. Herein, examples of the reactive group may include a carboxyl group, a (meth)acrylic group, an epoxy group, a mercapto group, an isocyanate group, and an amino group.

In the formula (1), $A^1$ and $A^2$ each independently represent a group selected from the group consisting of a 1,4-phenylene group, a 1,4-cyclohexylene group, a 1,4-cyclohexenylene group, a 4,4'-biphenylene group, a 4,4'-bicyclohexylene group, and a 2,6-naphthylene group. The 1,4-phenylene group, 1,4-cyclohexylene group, 1,4-cyclohexenylene group, 4,4'-biphenylene group, 4,4'-bicyclohexylene group, and 2,6-naphthylene group may be unsubstituted or substituted with one or more substituents such as a halogen atom, a hydroxyl group, a carboxyl group, a cyano group, an amino group, an alkyl group of 1 to 10 carbon atoms, and an alkyl halide group. When two or more substituents are present in each of $A^1$ and $A^2$, they may be the same as, or different from, each other.

Particularly preferable examples of $A^1$ and $A^2$ may include groups selected from the group consisting of a 1,4-phenylene group, a 4,4'-biphenylene group, and a 2,6-naphthylene group. These aromatic ring skeletons are relatively rigid compared to the alicyclic skeleton, have a high affinity for mesogens of rod-shaped liquid crystal compounds, and can elevate orientation uniformity.

In the formula (1), B is selected from the group consisting of a single bond, —O—, —S—, —S—S—, —CO—, —CS—, —OCO, —CH$_2$—, —OCH$_2$—, —CH=N—N=CH—, —NHCO—, —O—(C=O)—O—, —CH$_2$—(C=O)—O—, and —CH$_2$O—(C=O)—.

Particularly preferable examples of B may include a single bond, —O—(C=O)—, and —CH=N—N=CH—.

It is preferable that at least one type of the compound represented by the formula (1) has liquid crystal properties and also has chirality. The compound represented by the formula (1) is preferably a combination of a plurality of optical isomers. For example, a mixture of plural types of enantiomers, a mixture of plural types of diastereomers, or a mixture of an enantiomer and a diastereomer may be used. It is preferable that at least one of the compounds represented by the formula (1) has a melting point in the range of 50° C. to 150° C.

When the compound represented by the formula (1) has liquid crystal properties, it is preferable that the compound has a high refractive index anisotropy Δn. By using a liquid crystal compound having a high refractive index anisotropy Δn as the compound represented by the formula (1), the refractive index anisotropy Δn of the liquid crystal composition containing the compound can be improved, and a cholesteric resin layer having a wide wavelength range in which reflecting circularly polarized light can be reflected can be produced. The refractive index anisotropy Δn of at least one type of the compound represented by the formula (1) is preferably 0.18 or more, and more preferably 0.22 or more. Herein, the refractive index anisotropy Δn may be measured by the Senarmont method. For example, a retardation (Re) may be calculated by a calculation formula of Re=λ (546 nm)×θ/180 on the basis of observation of the extinction position (θ) of the cured resin layer using an optical microscope (ECLIPSE E600POL (transmission and reflection type) equipped with a sensitive color plate, a λ/4 wave plate, a Senarmont compensator, and a GIF filter 546 nm, manufactured by Nikon Corp.), and Δn may be calculated by a calculation formula Δn=Re/d from the film thickness (d) of the liquid crystal layer that is separately obtained.

Particularly preferable specific examples of the compound represented by the formula (1) may include the following compounds (A1) to (A10). As the compound, one type thereof may be solely used, and two or more types thereof may also be used in combination at any ratio.

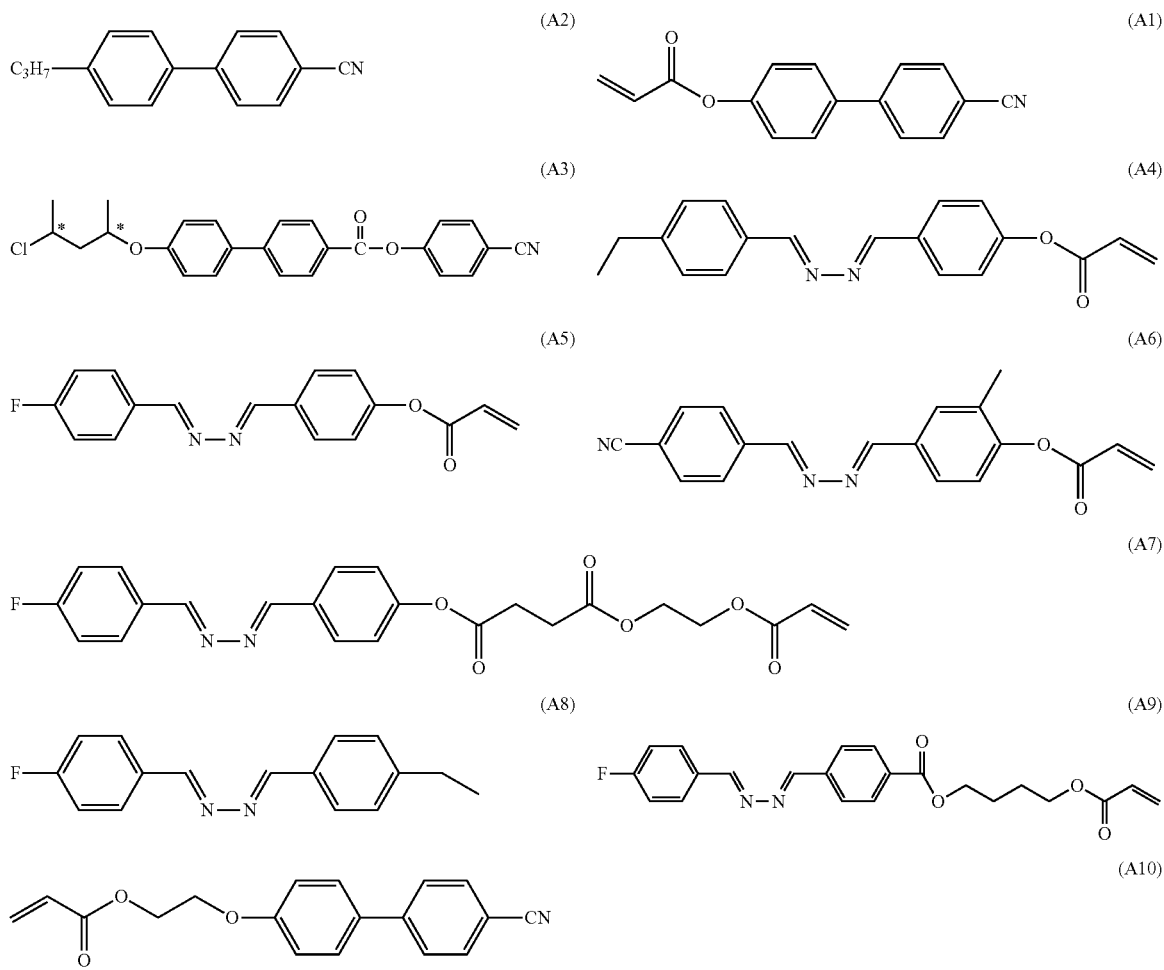

In the above-described compound (A3), "*" represents a chiral center.

As the rod-shaped liquid crystal compound used in combination with the compound represented by the above-mentioned formula (1), a rod-shaped liquid crystal compound having a refractive index anisotropy Δn of 0.18 or more and having at least two reactive groups in one molecule is preferable. Examples of such a rod-shaped liquid crystal compound may include compounds represented by the formula (2).

$$R^3\text{—}C^3\text{-}D^3\text{-}C^5\text{-}M\text{-}C^6\text{-}D^4\text{-}C^4\text{—}R^4 \qquad \text{Formula (2)}$$

In the formula (2), $R^3$ and $R^4$ are each a reactive group, and each independently represent a group selected from the group consisting of a (meth)acrylic group, a (thio)epoxy group, an oxetane group, a thiethanyl group, an aziridinyl group, a pyrrole group, a vinyl group, an allyl group, a fumarate group, a cinnamoyl group, an oxazoline group, a mercapto group, an iso(thio)cyanate group, an amino group, a hydroxyl group, a carboxyl group, and an alkoxysilyl group. When the compound has these reactive groups, it is possible to obtain a cured product having a film strength that can withstand practical use when the liquid crystal composition is cured. Herein, the film strength which can withstand practical use is a pencil hardness (JIS K5400) of usually HB or more, and preferably H or more. By increasing the film strength in this manner, the tendency of the film to have scratches can be reduced, and therefore handling properties can be improved.

In the formula (2), $D^3$ and $D^4$ represent a group selected from the group consisting of a single bond, a linear or branched alkyl group of 1 to 20 carbon atoms, and a linear or branched alkylene oxide group of 1 to 20 carbon atoms.

In the formula (2), $C^3$ to $C^6$ represent a group selected from the group consisting of a single bond, —O—, —S—, —S—S—, —CO—, —CS—, —OCO—, —CH$_2$—, —OCH$_2$—, —CH=N—N=CH—, —NHCO—, —O—(C=O)—O—, —CH$_2$(C=O)—O—, and —CH$_2$O—(C=O)—.

In the formula (2), M represents a mesogenic group. Specifically, M represents a group in which two to four skeletons that may be unsubstituted or substituted with a substituent and are selected from the group consisting of azomethines, azoxys, phenyls, biphenyls, terphenyls, naphthalenes, anthracenes, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, and alkenylcyclohexylbenzonitriles are bonded with a linking group such as —O—, —S—, —S—S—, —CO—, —CS—, —OCO—, —CH$_2$—, —OCH$_2$—, —CH=N—N=CH—, —NHCO—, —O—(C=O)—O—, —CH$_2$(C=O)—O—, and —CH$_2$O—(C=O)—.

Examples of the substituents the mesogenic group M may have may include a halogen atom, an alkyl group of 1 to 10 carbon atoms optionally having a substituent, a cyano group, a nitro group, —O—R$^5$, —O—C(=O)—R$^5$, —C(=O)—O—R$^5$, —O—C(=O)—O—R$^5$, —NR$^5$—C(=O)—R$^5$, —C(=O)—NR$^5$R$^7$, and —O—C(=O)—NR$^5$R$^7$. Herein, R$^5$ and R$^7$ represent a hydrogen atom or an alkyl group of 1 to 10 carbon atoms. When R$^5$ and R$^7$ are an alkyl group, the alkyl group may include —O—, —S—, —O—C(=O)—, —C(=O)—O—, —O—C(=O)—O—, —NR$^6$—C(=O)—, —C(=O)—NR$^6$—, —NR$^6$—, or —C(=O)— intervened (except for cases where two or more adjacent —O—'s and —S—'s are intervened). Herein, R$^6$ represents a hydrogen atom or an alkyl group of 1 to 6 carbon atoms.

Examples of the substituents in the above-mentioned "alkyl group of 1 to 10 carbon atoms optionally having a substituent" may include a halogen atom, a hydroxyl group, a carboxyl group, a cyano group, an amino group, an alkoxy group of 1 to 6 carbon atoms, an alkoxyalkoxy group of 2 to 8 carbon atoms, an alkoxyalkoxyalkoxy group of 3 to 15 carbon atoms, an alkoxycarbonyl group of 2 to 7 carbon atoms, an alkylcarbonyloxy group of 2 to 7 carbon atoms, and an alkoxycarbonyloxy group of 2 to 7 carbon atoms.

The rod-shaped liquid crystal compound preferably has an asymmetric structure. The asymmetric structure herein refers to a structure in which $R^3$—$C^3$-$D^3$-$C^5$— and —$C^6$-$D^4$-$C^4$—$R^4$ differ from each other about the center mesogenic group M in the formula (2). When a rod-shaped liquid crystal compound having an asymmetric structure is used as the rod-shaped liquid crystal compound, the orientation uniformity can be further enhanced.

The refractive index anisotropy Δn of the rod-shaped liquid crystal compound is preferably 0.18 or more, and more preferably 0.22 or more. When a rod-shaped liquid crystal compound having a refractive index anisotropy Δn of 0.30 or more is used, the absorption edge on the long wavelength side of the ultraviolet absorption spectrum may extend into the visible range. However, such a compound can be used as long as it does not adversely affect the desired optical performance even if the absorption edge of the spectrum thereof extends into the visible range. By using such a rod-shaped liquid crystal compound having a high refractive index anisotropy Δn, it is possible to obtain a cholesteric resin layer having a high optical performance (for example, a selective reflection performance of circularly polarized light).

Preferable specific examples of the rod-shaped liquid crystal compound may include the following compounds (B1) to (B10). As the compound, one type thereof may be solely used, and two or more types thereof may also be used in combination at any ratio.

(B1)

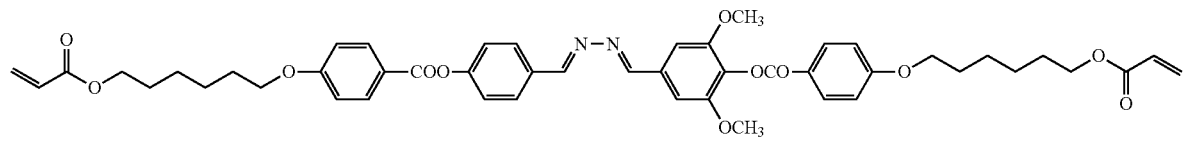

-continued (B2)
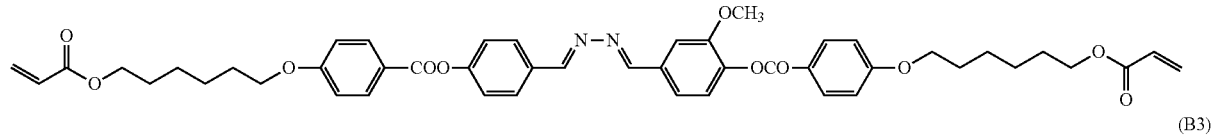

(B3)
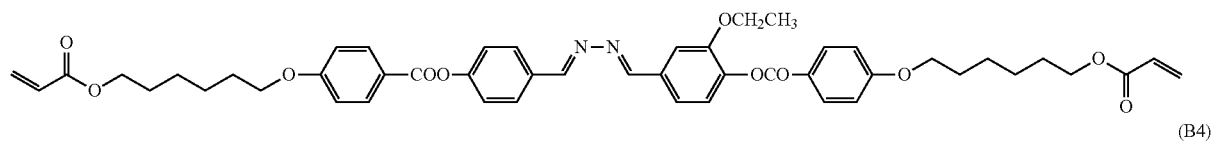

(B4)
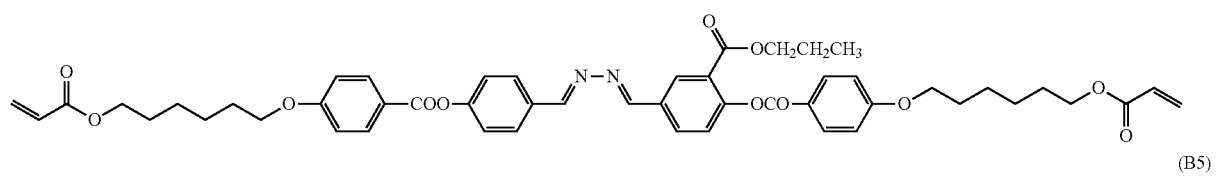

(B5)
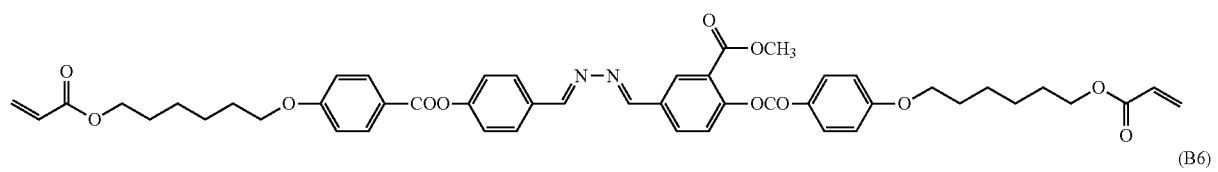

(B6)
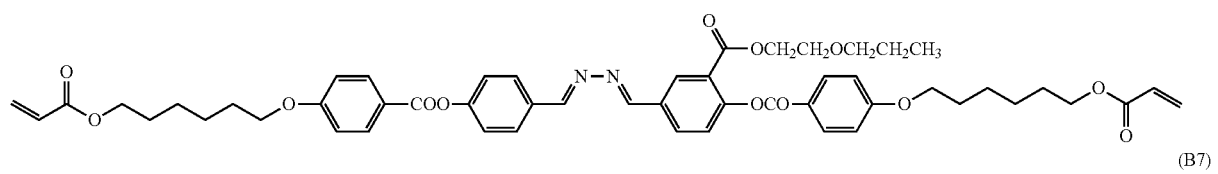

(B7)
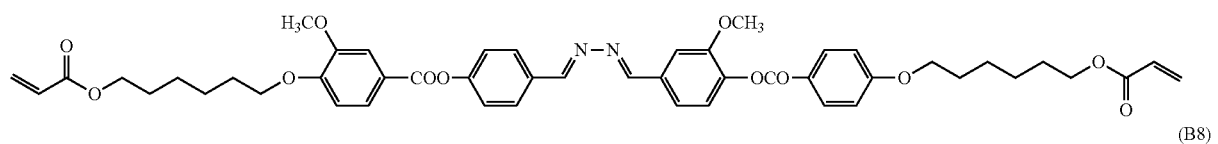

(B8)
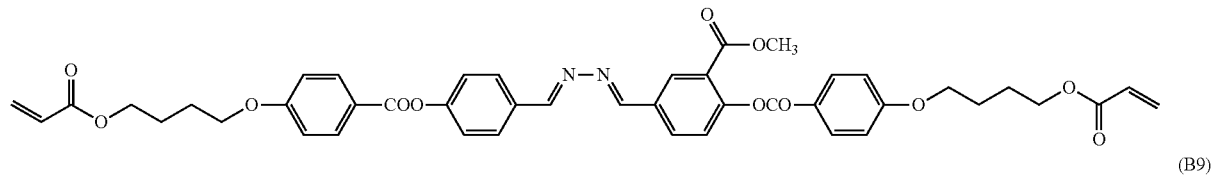

(B9)
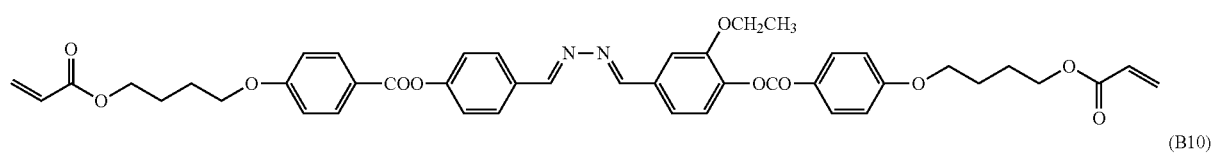

(B10)
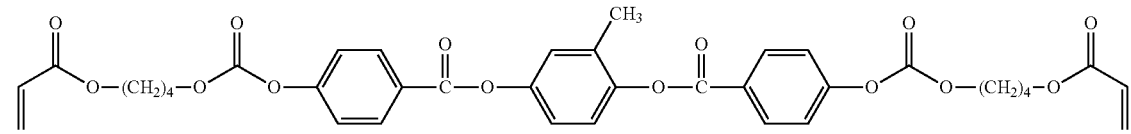

The weight ratio represented by (total weight of the compound represented by the formula (1))/(total weight of the rod-shaped liquid crystal compound) is preferably 0.05 or more, more preferably 0.1 or more, and particularly preferably 0.15 or more, and is preferably 1 or less, more preferably 0.65 or less, and particularly preferably 0.45 or less. By setting the weight ratio to be equal to or more than the lower limit value of the above-described range, the orientation uniformity in the liquid crystal composition film can be enhanced. In addition, by setting the weight ratio to be equal to or less than the upper limit value, the orientation uniformity can be enhanced. In addition, the stability of the liquid crystal phase of the liquid crystal composition can also be enhanced. Further, the refractive index anisotropy Δn of the liquid crystal composition can be increased, and thereby a cholesteric resin layer having a desired optical performance (for example, selective reflection performance of circularly polarized light) can be stably obtained. Herein, the total weight indicates its weight when one type is used, and indicates the total weight when two or more types are used.

When the compound represented by the formula (1) and the rod-shaped liquid crystal compound are used in combination, the molecular weight of the compound represented by the formula (1) is preferably less than 600, and the molecular weight of the rod-shaped liquid crystal compound is preferably 600 or more. Accordingly, the compound represented by the formula (1) can enter into the gap of the rod-shaped liquid crystal compound having a molecular weight larger than that of the compound, so that the orientation uniformity can be improved.

The liquid crystal composition may optionally contain a crosslinking agent for improving film strength and durability after curing. As the crosslinking agent, a crosslinking agent whose reaction simultaneously proceeds with the curing of the film of the liquid crystal composition, whose the reaction is accelerated by heat treatment after curing, or whose reaction spontaneously proceeds by humidity, to thereby increase the crosslinking density of the cholesteric resin layer, and which does not deteriorate the orientation uniformity, may be appropriately selected. Therefore, for example, any optional crosslinking agent that causes curing by ultraviolet rays, heat, humidity, or the like may be suitably used. Examples of the crosslinking agents may include: a polyfunctional acrylate compound such as trimethylolpropanetri(meth)acrylate, pentaerythritol tri(meth)acrylate, pentaerythritol tetra(meth)acrylate, dipentaerythritol hexa(meth)acrylate, and 2-(2-vinyloxyethoxy)ethyl acrylate; an epoxy compound such as glycidyl (meth)acrylate, ethylene glycol diglycidyl ether, glycerine triglycidyl ether, and pentaerythritol tetraglycidyl ether; an aziridine compound such as 2,2-bishydroxymethylbutanol-tris[3-(1-aziridinyl)propionate], 4,4-bis(ethylene iminocarbonylamino)diphenylmethane, and trimethylolpropane-tri-β-aziridinyl propionate; an isocyanate compound such as hexamethylene diisocyanate, isocyanurate-type isocyanate derived from hexamethylene diisocyanate, biuret-type isocyanate, and adduct-type isocyanate; a polyoxazoline compound having an oxazoline group in its side chain; and an alkoxysilane compound such as vinyltrimethoxysilane, N-(2-aminoethyl) 3-aminopropyltrimethoxysilane, 3-aminopropyltrimethoxysilane, 3-glycidoxypropyltrimethoxysilane, 3-(meth)acryloxypropyltrimethoxysilane, and N-(1,3-dimethylbutylidene)-3-(triethoxysilyl)-1-propanamine. As the crosslinking agent, one type thereof may be solely used, and two or more types thereof may also be used in combination at any ratio. In addition, any publicly known catalyst may be used depending on the reactivity of the crosslinking agent. By using the catalyst, productivity can be improved in addition to the improvement in film strength and durability of the cholesteric resin layer.

It is preferable that the amount of the crosslinking agent in the cholesteric resin layer obtained by curing the film of the liquid crystal composition is 0.1% by weight to 15% by weight. By setting the amount of the crosslinking agent to be equal to or more than the lower limit value of the above-described range, the crosslinking density can be effectively increased. By setting the amount to be equal to or less than the upper limit value, the stability of the film of the liquid crystal composition can be enhanced.

The liquid crystal composition usually contains a photoinitiator for acquiring photocurability. As the photoinitiator, for example, any publicly known compounds which generate a radical or an acid by ultraviolet rays or visible light rays may be used. Examples of the photoinitiators may include benzoin, benzylmethylketal, benzophenone, biacetyl, acetophenone, Michler's ketone, benzyl, benzyl isobutyl ether, tetramethylthiuram mono(di)sulfide, 2,2-azobisisobutyronitrile, 2,2-azobis-2,4-dimethylvaleronitrile, benzoyl peroxide, di-tert-butyl peroxide, 1-hydroxycyclohexyl phenyl ketone, 2-hydroxy-2-methyl-1-phenyl-propane-1-one, 1-(4-isopropylphenyl)-2-hydroxy-2-methylpropane-1-one, thioxanthone, 2-chlorothioxanthone, 2-methylthioxanthone, 2,4-diethylthioxanthone, methylbenzoylformate, 2,2-diethoxyacetophenone, β-ionone, β-bromostyrene, diazoaminobenzene, α-amylcinnamic aldehyde, p-dimethylaminoacetophenone, p-dimethylaminopropiophenone, 2-chlorobenzophenone, pp'-dichlorobenzophenone, pp'-bisdiethylaminobenzophenone, benzoin ethyl ether, benzoin isopropyl ether, benzoin n-propyl ether, benzoin n-butyl ether, diphenyl sulfide, bis(2,6-methoxybenzoyl)-2,4,4-trimethyl-pentylphosphine oxide, 2,4,6-trimethylbenzoyldiphenyl-phosphine oxide, bis(2,4,6-trimethylbenzoyl)-phenylphosphine oxide, 2-methyl-1[4-(methylthio)phenyl]-2-morpholinopropane-1-one, 2-benzyl-2-dimethylamino-1-(4-morpholinophenyl)-butane-1-one, anthracene benzophenone, α-chloroanthraquinone, diphenyldisulfide, hexachlorbutadiene, pentachloro butadiene, octachloro butene, 1-chloromethyl naphthalene, a carbazole oxime compound such as 1,2-octanedione-1-[4-(phenylthio)-2-(o-benzoyloxime)] and 1-[9-ethyl-6-(2-methylbenzoyl)-9H-carbazol-3-yl]ethanone 1-(o-acetyloxime), (4-methylphenyl)[4-(2-methylpropyl)phenyl]iodonium hexafluorophosphate, 3-methyl-2-butynyl tetramethylsulfonium hexafluoroantimonate, and diphenyl-(p-phenylthiophenyl)sulfonium hexafluoroantimonate. As these compounds, one type thereof may be solely used, and two or more types thereof may also be used in combination at any ratio. Furthermore, if necessary, the curability may be controlled by using a publicly known photosensitizer or a tertiary amine compound as a polymerization accelerator.

The amount of the photoinitiator is preferably 0.03% by weight to 7% by weight in the liquid crystal composition. By setting the amount of the photoinitiator to be equal to or more than the lower limit value of the above-described range, the degree of polymerization can be increased, so that the film strength of the cholesteric resin layer can be increased. By setting the amount to be equal to or less than the upper limit value, the favorable orientation of the liquid crystal compound can be achieved, so that the liquid crystal phase of the liquid crystal composition can be stabilized.

The liquid crystal composition may optionally contain a surfactant. As the surfactant, for example, a surfactant which does not inhibit orientation may be appropriately selected and used. Suitable examples of such a surfactant may include a nonionic surfactant containing a siloxane or a fluorinated alkyl group in a hydrophobic group portion. Among these, an oligomer having two or more hydrophobic group moieties per molecule is particularly suitable. Specific examples of these surfactants used may include PolyFox PF-151N, PF-636, PF-6320, PF-656, PF-6520, PF-3320, PF-651, and PF-652 available from OMNOVA Solutions Inc.; Ftergent FTX-209F, FTX-208G, and FTX-204D available from NEOS Co., Ltd.; and Surflon KH-40 available from AGC Seimi Chemical Co., Ltd. As the surfactant, one type thereof may be solely used, and two or more types thereof may also be used in combination at any ratio.

The amount of the surfactant in the cholesteric resin layer obtained by curing the liquid crystal composition is preferably 0.05% by weight to 3% by weight. By setting the amount of the surfactant to be equal to or more than the lower limit value of the above-mentioned range, the orientation regulating force at the air interface can be increased, and thereby orientation defects can be prevented. By setting the amount to be equal to or less than the upper limit value, it is possible to prevent deterioration of orientation uniformity due to excessive surfactant entering between the liquid crystal molecules.

The liquid crystal composition may optionally contain a chiral agent. Usually, the twist direction of the cholesteric resin layer may be appropriately selected by the selection of the type and structure of the chiral agent used. In the case of directing the twist to the clockwise direction, a chiral agent that gives a dextro-rotatory property may be used, and in the case of directing the twist to the counterclockwise direction, a chiral agent that gives a levo-rotatory property may be used. Specific examples of the chiral agent that may be used may include those disclosed in Japanese Patent Application Laid-Open No. 2005-289881 A, Japanese Patent Application Laid-Open No. 2004-115414 A, Japanese Patent Application Laid-Open No. 2003-66214 A, Japanese Patent Application Laid-Open No. 2003-313187 A, Japanese Patent Application Laid-Open No. 2003-342219 A, Japanese Patent Application Laid-Open No. 2000-290315 A, Japanese Patent Application Laid-Open No. Hei. 6-072962 A, U.S. Pat. No. 6,468,444, International Publication No. 98/00428, and Japanese Patent Application Laid-Open No. 2007-176870 A. For example, such a chiral agent is available as Paliocolor LC756 from BASF Corp. As the chiral agent, one type thereof may be solely used, and two or more types thereof may also be used in combination at any ratio.

The amount of the chiral agent may be optionally set within a range that does not deteriorate the desired optical performance. A specific amount of the chiral agent is usually 1% by weight to 60% by weight in the liquid crystal composition.

The liquid crystal composition may further contain other optional components if necessary. Examples of the optional component may include a solvent, a polymerization inhibitor for improving pot life, an antioxidant for improving durability, an ultraviolet absorber, and a light stabilizer. As these optional components, one type thereof may be solely used, and two or more types thereof may also be used in combination at any ratio. The amount of these optional components may be optionally set within a range that does not deteriorate the desired optical performance.

The method for producing the liquid crystal composition is not particularly limited, and the liquid crystal composition may be produced by mixing the above-described respective components.

After the photocurable liquid crystal composition is prepared, a film of the liquid crystal composition is formed on the substrate film. Usually, the film of the liquid crystal composition is formed by applying the liquid crystal composition onto the surface of the substrate film. When the substrate film has an orientation film, the film of the liquid crystal composition is usually formed on the orientation film. Further, before the liquid crystal composition is applied, the surface of the substrate film may be subjected to a treatment such as a corona discharge treatment and a rubbing treatment, if necessary.

The application of the liquid crystal composition may be carried out by a publicly known method such as an extrusion coating method, a direct gravure coating method, a reverse gravure coating method, a die coating method, and a bar coating method.

After the film of the liquid crystal composition is formed on the substrate film, an orientation treatment may be performed if necessary. The orientation treatment may be performed, for example, by warming the film of the liquid crystal composition at 50° C. to 150° C. for 0.5 minute to 10 minutes. By subjecting the film to the orientation treatment, the liquid crystal composition in the film can be favorably oriented.

After that, in order to cure the film of the liquid crystal composition, a curing treatment is performed. The curing treatment may be performed, for example, by one or more times of a combination of light irradiation and a warming treatment.

The warming condition may be, for example, a temperature of usually 40° C. or higher, and preferably 50° C. or higher, and usually 200° C. or lower, and preferably 140° C. or lower, and a time of usually 1 second or more, and preferably 5 seconds or more, and usually 3 minutes or less, and preferably 120 seconds or less.

The light used for light irradiation includes not only visible light but also ultraviolet rays and other electromagnetic rays. The light irradiation may be performed, for example, by irradiation of light having a wavelength of 200 nm to 500 nm for 0.01 second to 3 minutes. The energy of the light for irradiation may, for example, be 0.01 mJ/cm$^2$ to 50 mJ/cm$^2$.

By alternately repeating the weak ultraviolet ray irradiation at a dose of 0.01 mJ/cm$^2$ to 50 mJ/cm$^2$ and the warming treatment a plurality of times, it is possible to obtain a cholesteric resin layer wherein the pitch of the helical structure is continuously and greatly changed to thereby have a circularly polarized light separating function with a wide reflective band. After expanding the reflective band by the weak ultraviolet ray irradiation, irradiation of relatively intense ultraviolet rays at a dose such as 50 mJ/cm$^2$ to 10,000 mJ/cm$^2$ may be performed for completely polymerizing the liquid crystal compound, and thereby a cholesteric resin layer having high mechanical strength can be obtained. The expansion of the reflection band and the irradiation of intense ultraviolet rays may be performed under air. Alternatively, a part or all of the process may be performed under an atmosphere in which the oxygen concentration is controlled (for example, under a nitrogen atmosphere).

The foregoing process of applying and curing the liquid crystal composition is not limited to be performed one time, and the application and curing may be repeated a plurality of times. By such a repetition, two or more cholesteric resin layers can be formed. However, by using the liquid crystal composition described in the foregoing example, it is possible to easily form a cholesteric resin layer containing a well-oriented rod-shaped liquid crystal compound and having a thickness of 5 μm or more by only one time of application and curing of the liquid crystal composition.

[2.3. Configuration of Multilayer Film]

The multilayer film 10 obtained in the step 1 may have the configuration shown in FIG. 2. The multilayer film 10 is subjected to the step 2.

3. Step (2)

The step (2) is a step in which the multilayer film is pressed by a member(s) having a concavo-convex shape to form cracks in the resin thin film. In the present embodiment, in the step (2), the multilayer film 10 is pressed by being sandwiched between the member 110 having a concavo-convex shape and the supporting member 120 to form cracks in the resin thin film 11 of the multilayer film 10, and then the multilayer film 10 is further pressed by being sandwiched between the member 115 having a concavo-convex shape and the supporting member 125 to form cracks in the resin thin film 11 of the multilayer film 10.

Figure 3:
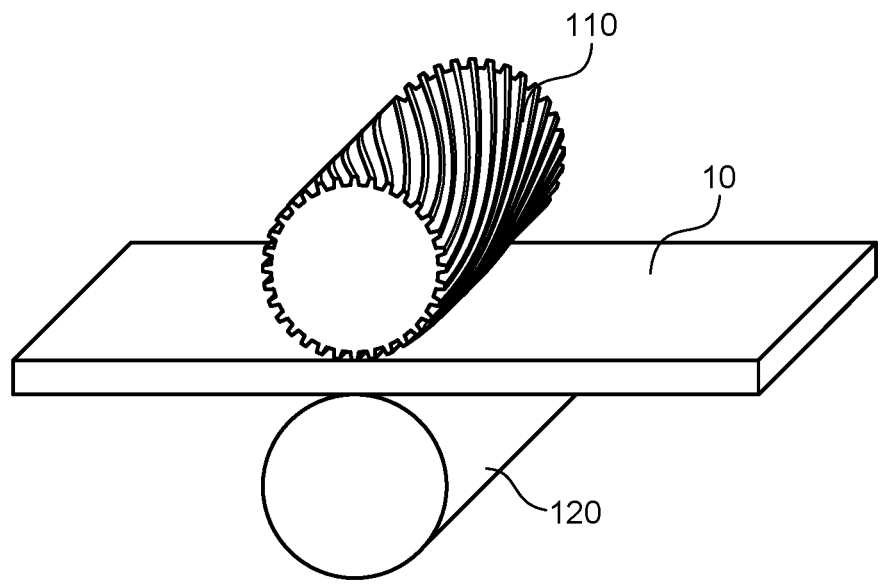
FIG. 3 is a perspective view schematically showing an example of a member having a concavo-convex shape usable in the producing method according to the first embodiment.
Figure 4:
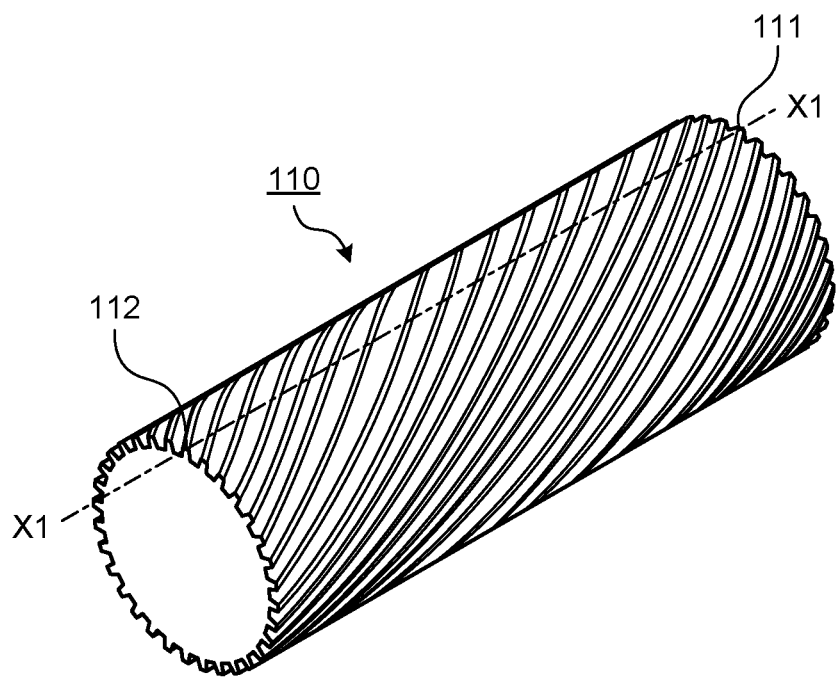
FIG. 4 is a perspective view schematically showing the member having a concavo-convex shape shown in FIG. 3.
Figure 5:
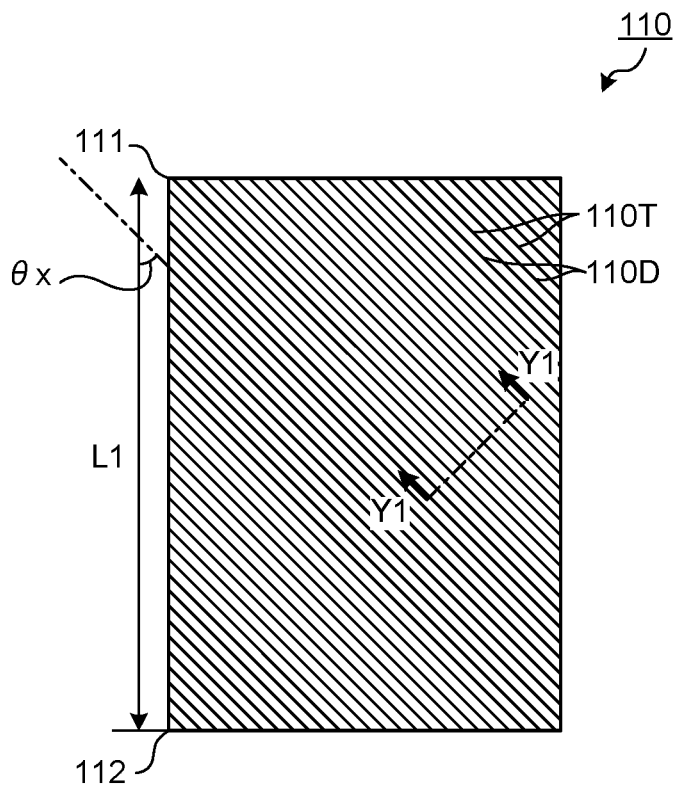
FIG. 5 is a plan view schematically showing the member of FIG. 4 in a state of being cut along line X1-X1 and developed.
Figure 6:
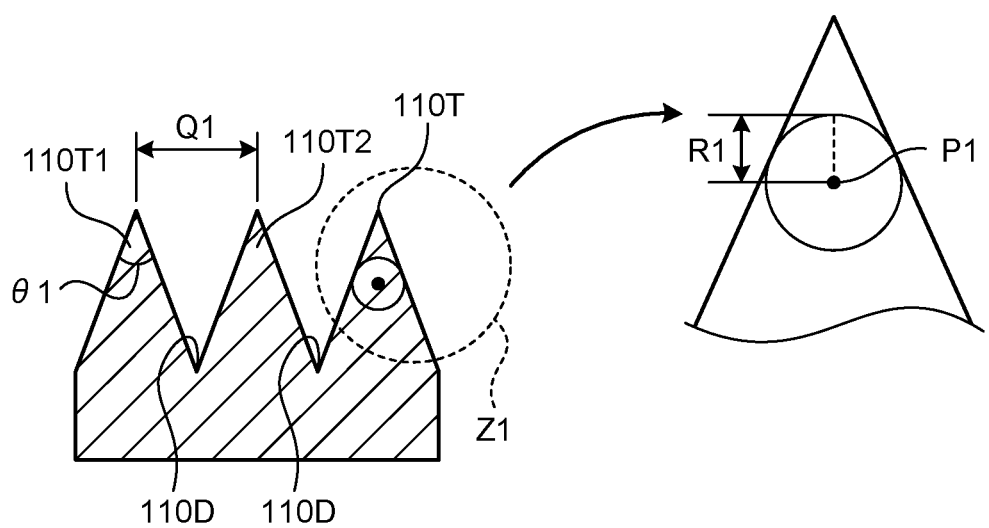
FIG. 6 is a partial cross-sectional view taken along line Y1-Y1 in FIG. 5.
Figure 7:
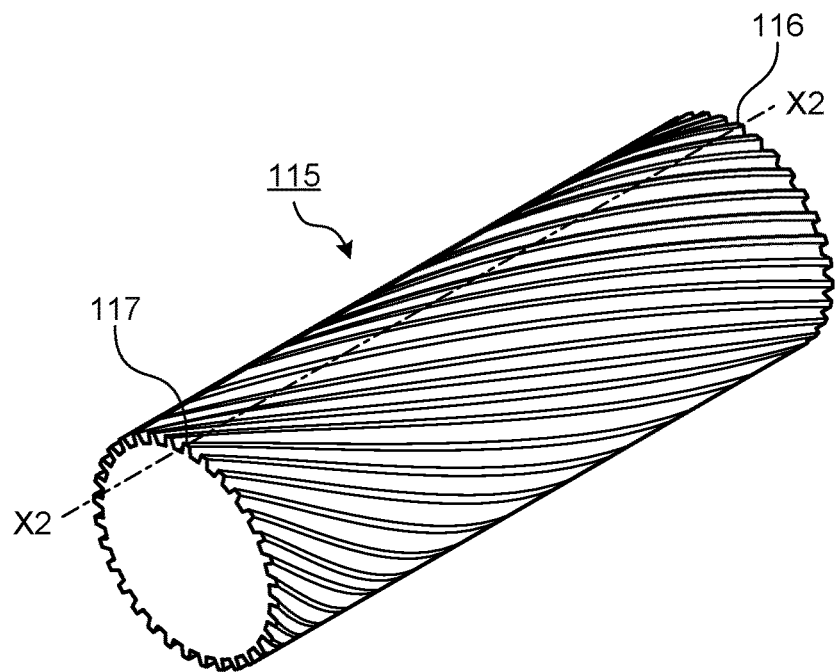
FIG. 7 is a perspective view schematically showing a member 115 having a concavo-convex shape usable in the producing method according to the first embodiment.
Figure 8:
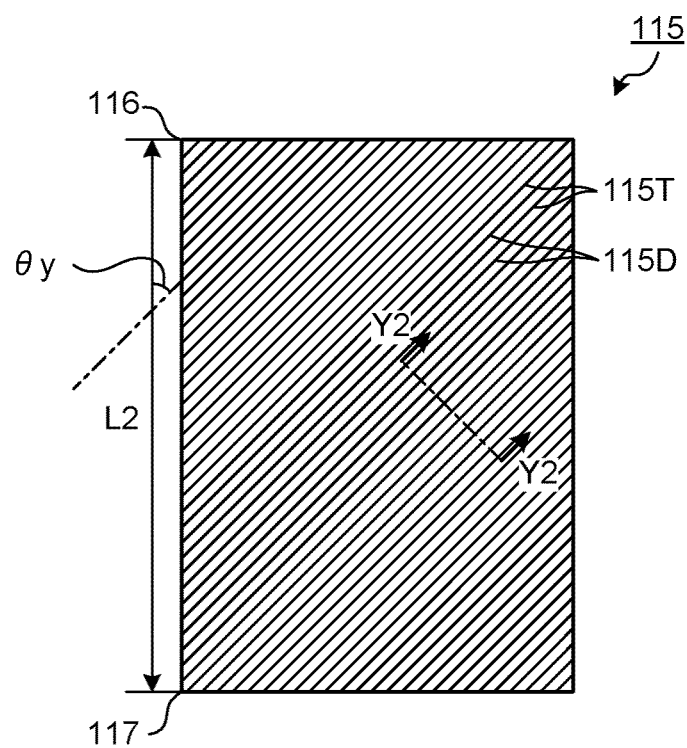
FIG. 8 is a plan view schematically showing the member of FIG. 7 in a state of being cut along line X2-X2 and developed.
Figure 9:
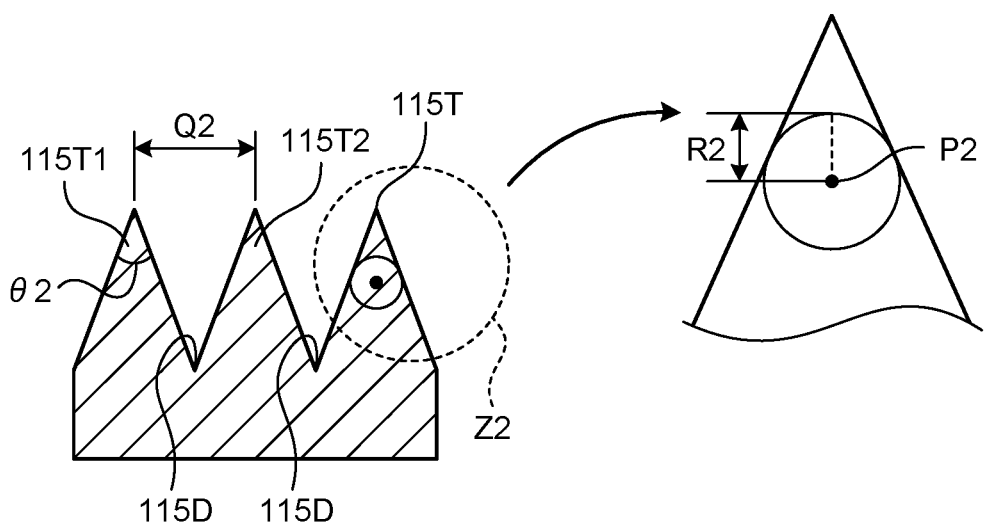
FIG. 9 is a partial cross-sectional view taken along line Y2-Y2 in FIG. 8.
Figure 10:
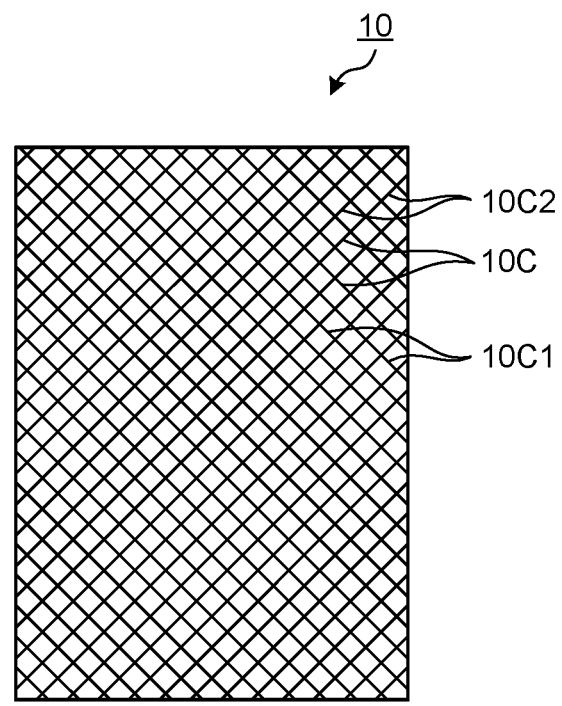
FIG. 10 is a plan view schematically showing a multilayer film having cracks formed by the members having a concavo-convex shape.
Figure 11:
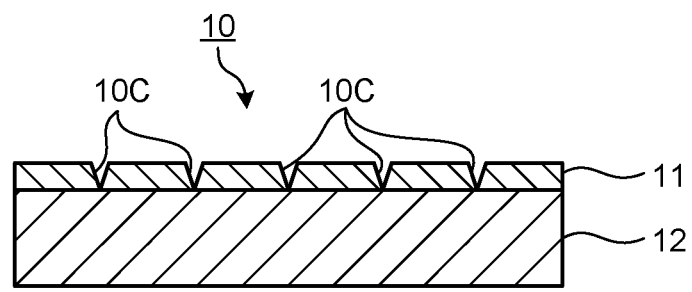
FIG. 11 is a cross-sectional view schematically showing a multilayer film having cracks formed by the members having a concavo-convex shape.

The step (2) will be described with reference to FIG. 1 and FIGS. 3 to 11. FIG. 3 is a perspective view schematically showing an example of a member having a concavo-convex shape usable in the method for producing flakes of the resin thin film according to the present embodiment. FIG. 4 is a perspective view schematically showing the member having a concavo-convex shape shown in FIG. 3. FIG. 5 is a plan view schematically showing the member of FIG. 4 in a state of being cut along line X1-X1 and developed. FIG. 6 is a partial cross-sectional view taken along line Y1-Y1 in FIG. 5. FIG. 7 is a perspective view schematically showing the member 115 having a concavo-convex shape usable in the method for producing flakes of the resin thin film according to the present embodiment. FIG. 8 is a plan view schematically showing the member of FIG. 7 in a state of being cut along line X2-X2 and developed. FIG. 9 is a partial cross-sectional view taken along line Y2-Y2 in FIG. 8. FIG. 10 is a plan view schematically showing a multilayer film having cracks formed by the members having a concavo-convex shape. FIG. 11 is a cross-sectional view schematically showing a multilayer film having cracks formed by the members having a concavo-convex shape.

[3.1. Members Used in Step (2)]

The outside surface (surface to come into contact with the multilayer film 10) of the member 110 having a concavo-convex shape has recesses and projections as shown in FIG. 3. The outside surface of the member 115 having a concavo-convex shape also has recesses and projections as shown in FIG. 7. The members 110 and 115 having a concavo-convex shape are cylindrical as shown in FIG. 4 and FIG. 7 and can be rotationally moved on the multilayer film 10.

The supporting member 120 disposed on the substrate film-side surface (lower surface shown in the drawing) of the multilayer film 10 is a member to sandwich the multilayer film 10 together with the member 110 having a concavo-convex shape to press the multilayer film 10. The supporting member 125 disposed on the substrate film-side surface (lower surface shown in FIG. 1) of the multilayer film 10 is a member to sandwich the multilayer film 10 together with the member 115 having a concavo-convex shape to press the multilayer film 10. Each of the supporting members 120 and 125 is cylindrical and can be rotationally moved on the lower side of the double-layer film 10.

One of the surfaces of the multilayer film 10 (upper surface shown in the drawing) to come into contact with the members 110 and 115 having a concavo-convex shape is a surface having the resin thin film 11. When the multilayer film 10 is sandwiched between the member 110 having a concavo-convex shape and the supporting member 120, projections 110T of the member 110 having a concavo-convex shape come into contact with the resin thin film 11. When the multilayer film 10 is pressed in the state of being sandwiched between the member 110 having a concavo-convex shape and the supporting member 120, the projections 110T of the member 110 having a concavo-convex shape penetrate into the resin thin film 11, so that cracks 10C (10C1) are formed. Further, when the multilayer film 10 is sandwiched between the member 115 having a concavo-convex shape and the supporting member 125, projections 115T of the member 115 having a concavo-convex shape come into contact with the resin thin film 11. When the multilayer film 10 is pressed in the state of being sandwiched between the member 115 having a concavo-convex shape and the supporting member 125, the projections 115T of the member 115 having a concavo-convex shape penetrate into the resin thin film 11, so that cracks 10C (10C2) are formed. In this way, a multilayer film 10 having cracks 10C formed therein is obtained (see FIG. 10 and FIG. 11).

A pressing pressure when the multilayer film 10 is pressed by the members 110 and 115 having a concavo-convex shape is preferably 1 MPa or more, and more preferably 5 MPa or more, and is preferably 100 MPa or less, and more preferably 70 MPa or less. By setting the pressing pressure to be equal to or more than the lower limit value, cracks having a sufficient depth can be formed in the resin thin film. By setting the pressing pressure to be equal to or less than the upper limit value, breakage of the substrate film can be prevented, and recesses 110D, 115D of the member having a concavo-convex shape can be prevented from being filled with the resin thin film. The pressing pressure when the multilayer film 10 is pressed by the member 110 having a concavo-convex shape and the pressing pressure when the multilayer film 10 is pressed by the member 115 having a concavo-convex shape may be the same as, or different from, each other.

The outside surface of the member 110 having a concavo-convex shape has a concavo-convex shape. As shown in FIG. 5, the concavo-convex shape is a shape in which the projection 110T and the recess 110D, which extend in a direction tilted by an angle $9x$ with respect to a direction denoted by L1, are alternately and repeatedly formed in a direction perpendicular to a direction in which the projections 110T are formed. The angle θx is not particularly limited, and may be, for example, 45°. As shown in FIG. 5, when the member 110 having a concavo-convex shape is viewed from above the plane of the drawing, the concavo-convex shape is a shape in which straight lines downward to the right are run in parallel. The distance between the two adjacent projections 110T (distance Q1 between 110T1 and 110T2 shown in FIG. 6) may appropriately be set. In FIG. 4 and FIGS. 5, 111 and 112 denote the edges of the member 110 having a concavo-convex shape.

As shown in FIG. 6, the projections 110T have a mound-shaped cross section having a sharply-angled tip 110T1. In FIG. 6, 01 is the angle of the tips of the projections. The angle θ1 is preferably small, and may be, for example, 10° to 90°. In the cross sections of the projections, a radius R1 of a circle (circle having a center P1) inscribed in a tip portion of the projection (see the enlarged view of a Z1 portion) is preferably small, and may be, for example, 1 μm or less. The radius R1 may be measured by, for example, a microscope or a laser microscope. The shape of the tips of the projections 110T may be a rounded shape or a beveled shape as long as cracks can be formed in the resin thin film. The particle size distribution of the flakes can be controlled by adjusting the distance Q1 between the adjacent projections of the member 110 having a concavo-convex shape, the angle θ1 of the tips of the projections, and the radius R1.

The particle size distribution of the flakes may be measured by a flow particle image analyzer manufactured by Sysmex Corporation.

The outside surface of the member 115 having a concavo-convex shape has a concavo-convex shape. As shown in FIG. 8, the concavo-convex shape is a shape in which the projection 115T and the recess 115D, which extend in a direction tilted by an angle θy with respect to a direction denoted by L2, are alternately and repeatedly formed in a direction perpendicular to a direction in which the projections 115T are formed. The angle θy is not particularly limited, and may be, for example, 45°. As shown in FIG. 8, when the member 110 having a concavo-convex shape is viewed from above the plane of the drawing, the concavo-convex shape is a shape in which straight lines upward to the right are run in parallel. The distance between the two adjacent projections 115T (distance Q2 between 115T1 and 115T2 shown in FIG. 9) may appropriately be set. In FIG. 7 and FIGS. 8, 116 and 117 denote the edges of the member 115 having a concavo-convex shape.

As shown in FIG. 9, the projections 115T have a mound-shaped cross section having a sharply-angled tip 115T1. In FIG. 9, θ2 is the angle of the tips of the projections 115T. The angle θ2 is preferably small, and may be, for example, 10° to 90°. In the enlarged view of a Z2 portion shown in FIG. 9, R2 denotes a radius of a circle (circle having a center P2) inscribed in a tip portion of the projection. The radius R2 is preferably small, and may be, for example, 1 μm or less. The radius R2 may be measured by, for example, a microscope or a laser microscope. The shape of the tips of the projections 115T may be a rounded shape or a beveled shape as long as cracks can be formed in the resin thin film. The particle size distribution of the flakes can be controlled by adjusting the distance Q2 between the adjacent projections of the member 115 having a concavo-convex shape, the angle θ2 of the tips of the projections, and the radius R2.

As the material of the members 110 and 115 having a concavo-convex shape and the material of the supporting members 120 and 125, a material having strength such that breakage does not occur during pressing of the multilayer film and capable of forming a concavo-convex structure may be employed. Examples of such a material may include carbon steel and stainless steel. Further, the members 110 and 115 having a concavo-convex shape and the supporting members 120 and 125 may have a single-layer surface coating or a multilayer surface coating having two or more layers for the purpose of, for example, enhancing corrosion resistance, strength, or thermal conductivity. Examples of such a coating may include, but are not limited to, a plated coating of nickel, nickel-phosphorus, silicon, and copper and a coating formed by ceramic spraying. The members 110 and 115 having a concavo-convex shape may be equipped with, for example, a heating means using a heater, a heating medium, dielectric heating, or induction heating, or a neutralization device or a grounding wire for eliminating static electricity.

[3.2. Multilayer Film Having Cracks Obtained in Step (2)]

By performing the step (2), as shown in FIG. 10 and FIG. 11, cracks 10C are formed in the resin thin film 11 of the multilayer film 10. The multilayer film 10 having cracks 10C formed therein is subjected to the step (3).

The shape of the cracks 10C reflects the shape of the projections of the member 110 having a concavo-convex shape. For example, when the member 110 having a concavo-convex shape, whose developed shape is shown in FIG. 5, is disposed so that the direction L1 shown in FIG. 5 is parallel to the lengthwise direction of the multilayer film to press the multilayer film, cracks can be formed in a direction oblique to the lengthwise direction of the multilayer film 10. Then, when the member 115 having a concavo-convex shape, whose developed shape is shown in FIG. 8, is disposed so that the direction L2 shown in FIG. 8 is parallel to the lengthwise direction of the multilayer film to press the multilayer film, cracks 10C can be formed in a grid pattern as shown in FIG. 10. In FIG. 10, straight cracks 10C1 downward to the right are a reflection of the shape of the projections of the member 110 having a concavo-convex shape, and straight cracks 10C2 downward to the left are a reflection of the shape of the projections of the member 115 having a concavo-convex shape.

4. Step (3)

The step (3) is a step in which the resin thin film is stripped from the substrate film to obtain flakes. In the present embodiment, the step (3) includes a step (3A) of spraying a fluid onto the multilayer film having cracks formed therein to blow away the resin thin film having cracks, a step (3B) of collecting the blown resin thin film, and a step (3C) of pulverizing the collected resin thin film.

The resin thin film having cracks formed by pressing with the members having a concavo-convex shape is transferred into the stripping device 130. In the stripping device 130, the nozzle 131 capable of spraying a fluid is provided. The pressure of the fluid sprayed from the nozzle 131 is set to be high to the extent that the resin thin film 11 having cracks formed therein can be blown away from the substrate film 12. Further, the disposal direction of the nozzle 131 is set so that the resin thin film 11 can be blown away toward the collection path 132, which will be described later, by the fluid sprayed from the nozzle 131.

Examples of the fluid sprayed onto the multilayer film having cracks formed therein may include, but are not limited to, a gas such as air and a liquid such as water. The spray angle of the fluid with respect to the substrate film 12 may be an angle such that the resin thin film 11 can be stripped.

The resin thin film 11 (flakes 11A) blown away by spraying the fluid is transferred to the collection path 132 provided in the stripping device 130 and collected. The collection path 132 is connected to an unshown collector, and has a structure capable of guiding the resin thin film 11 sent by the stream of air sprayed from the nozzle 131 to the collector. Examples of such a collector may include a cyclone-type separator and various filters.

The substrate film 12 from which the resin thin film 11 has been stripped is transferred by a transfer roll 103 to the substrate film recovery unit 105. The substrate film recovery unit 105 is provided so that the substrate film 12 can be recovered by winding it into a roll in its lengthwise direction. In the present embodiment, the substrate film recovery unit 105 includes a winding core around which the substrate film 12 is to be wound, and this winding core is connected to a motor (not shown) as a drive unit capable of rotationally driving the winding core. The winding core has a structure capable of winding up the substrate film 12 at a desired recovery speed by the motor.

The collected resin thin film is usually pulverized using a pulverizer. Examples of the pulverizer may include a ball mill, a bead mill, a roll mill, a rod mill, and a stone-type grinder.

The average particle diameter of flakes of the resin thin film obtained by pulverization is preferably 1 μm or more from the viewpoint of decorativeness, and is preferably 500 μm or less, more preferably 100 μm or less from the viewpoint of film formability or printability.

The average particle diameter of flakes of the resin thin film obtained by the producing method according to the present embodiment may be measured by, for example, an image processing-type particle size distribution analyzer such as a flow particle distribution analyzer manufactured by Sysmex Corporation. The "average particle diameter" is a volume-average particle diameter.

5. Use Application of Flakes of Resin Thin Film

The flakes of the resin thin film produced by the aforementioned producing method may be used as a pigment in a paint. The paint contains a dispersion medium and the flakes (pigment) of the resin thin film dispersed in the dispersion medium. Hereinafter, the flakes of the resin thin film used as a pigment are referred to as a resin thin film pigment.

When the paint containing a resin thin film pigment is applied onto an article and dried, a layer containing the resin thin film pigment can be formed on the surface of the article. The article having the layer containing the resin thin film pigment can be used for various purposes by utilizing the properties of the resin thin film pigment. For example, when the resin thin film is a cholesteric resin layer, a layer containing the resin thin film pigment produced from the resin thin film has a circularly polarized light separating function in the same manner as the resin thin film itself. Therefore, a film having a circularly polarized light separating function can easily be formed on the surface of an article by using a paint produced using the resin thin film formed of a cholesteric resin layer.

The layer containing the resin thin film pigment can be applied to, for example, an anticounterfeit article, a security article, and a decorative article.

Examples of the anticounterfeit article may include a label, a sticker, and a display medium for verifying authenticity.

Examples of the security article may include a cash voucher, a gift coupon, a ticket, a certification, and an authentication medium such as a security card.

Examples of the decorative article may include a decoration article, stationery, furniture, a car (interior and exterior parts), a home appliance, a PC, and a cosmetics package.

Among these, the layer containing the resin thin film pigment is preferably applied to a display medium for verifying authenticity when the resin thin film pigment has a circularly polarized light separating function.

6. Action and Effect of Present Embodiment

According to the present embodiment, the resin thin film is stripped from the substrate film after cracks are formed. Therefore, flakes of the resin thin film can be more easily produced as compared with a case where the resin thin film is stripped from the substrate film and then the stripped resin thin film is pulverized. Further, according to the present embodiment, cracks are formed in the resin thin film by pressing the multilayer film with the member(s) having a concavo-convex shape. Therefore, the cracks are regular in shape, and resulting flakes can have a sharper particle size distribution as compared with a case where cracks are formed by folding the multilayer film. As a result, according to the present embodiment, it is possible to provide a producing method capable of efficiently producing flakes having a sharper particle size distribution than those in prior art.

Further, since the producing method according to the present embodiment includes the step (3A) of spraying a fluid onto the multilayer film having cracks formed therein to blow away the resin thin film having cracks and the step (3B) of collecting the blown resin thin film, flakes of the resin thin film can be efficiently produced and can be efficiently collected.

Further, since the producing method according to the present embodiment includes the step (3C) of pulverizing the collected resin thin film, flakes having a sharper particle size distribution can be produced.

Second Embodiment: Method for Producing Flakes of Resin Thin Film

Hereinbelow, a method for producing flakes of a resin thin film according to a second embodiment of the present invention will be described with reference to FIGS. 12 to 16.

The producing method according to the present embodiment is different from the producing method according to the first embodiment in that one type of member having a concavo-convex shape is used in the step (2) and that the member has a different concavo-convex shape. Components that are the same as those in the first embodiment are denoted by the same reference signs, and a redundant description thereof will be omitted.

Figure 12:
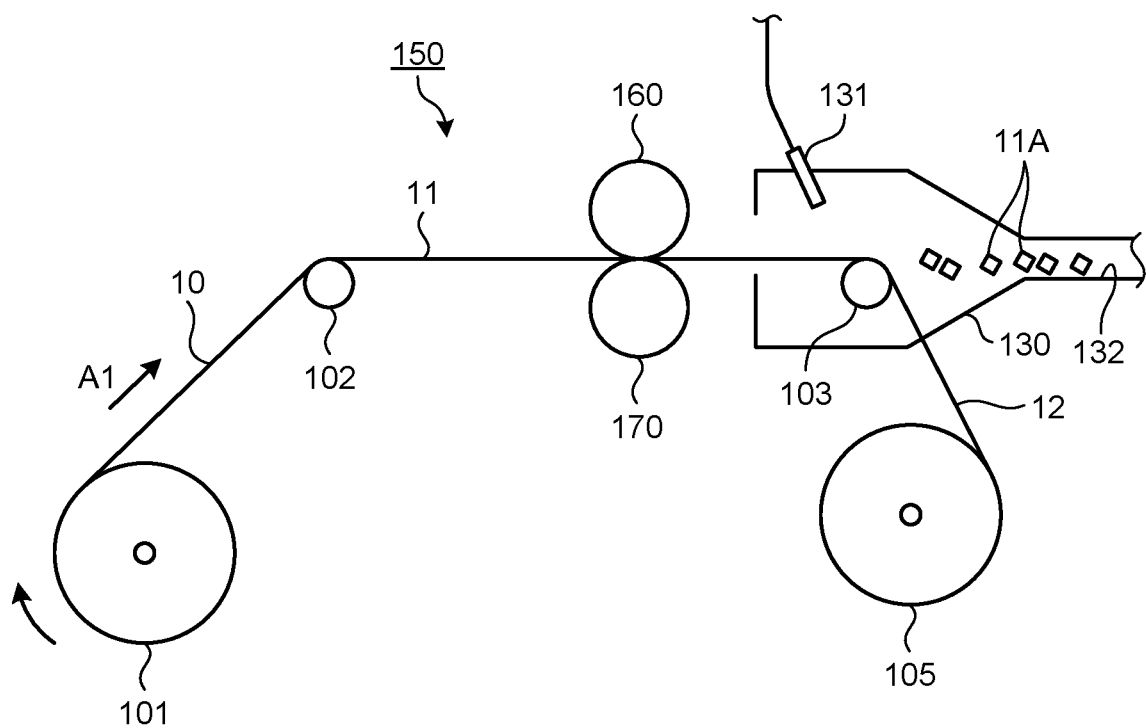
FIG. 12 is a side view schematically showing an apparatus used in a method for producing flakes of a resin thin film according to a second embodiment.
Figure 13:
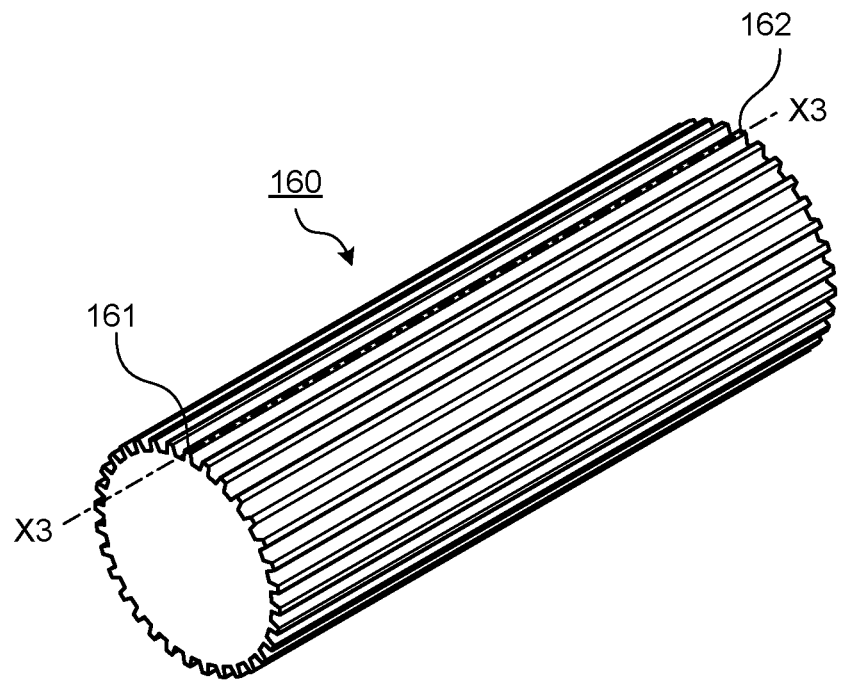
FIG. 13 is a perspective view schematically showing a member having a concavo-convex shape usable in the producing method according to the second embodiment.
Figure 14:
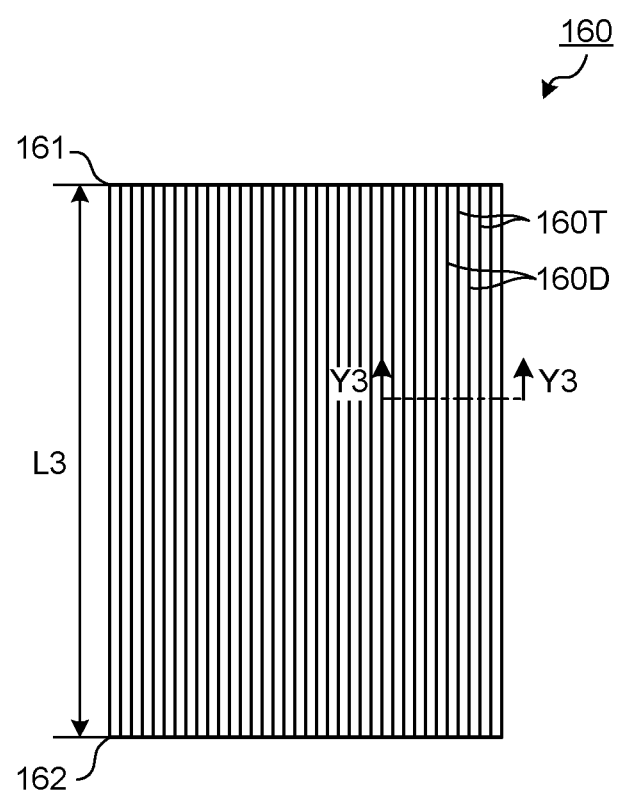
FIG. 14 is a plan view schematically showing the member of FIG. 13 in a state of being cut along line X3-X3 and developed.
Figure 15:
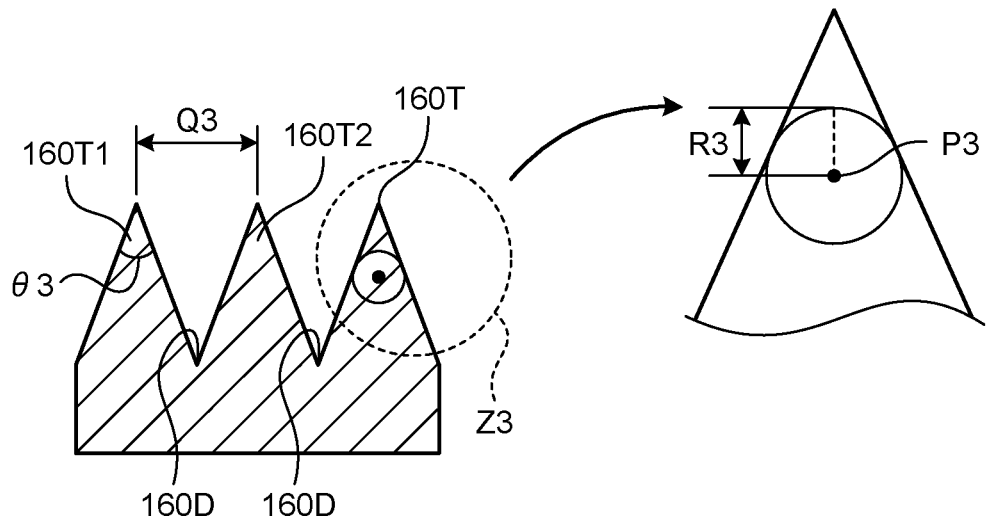
FIG. 15 is a partial cross-sectional view taken along line Y3-Y3 in FIG. 14.
Figure 16:
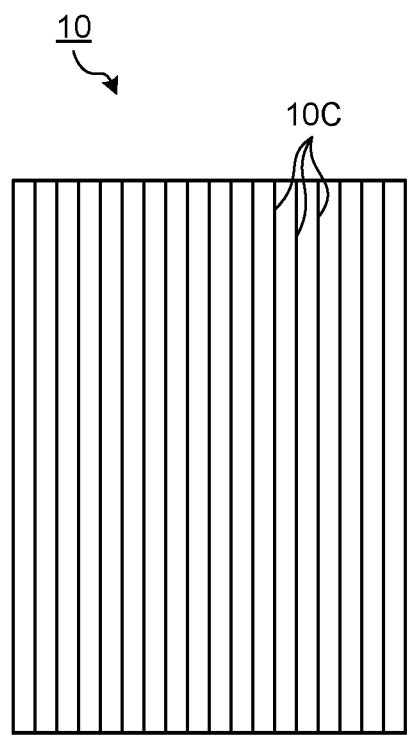
FIG. 16 is a plan view schematically showing a multilayer film having cracks formed by the member having a concavo-convex shape.
Figure 17:
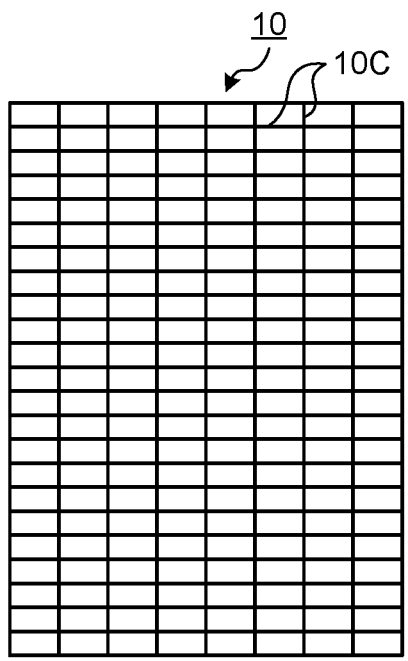
FIG. 17 is a plan view schematically showing a multilayer film having cracks formed by the member having a concavo-convex shape of FIG. 13.

FIG. 12 is a side view schematically showing an apparatus used in the method for producing flakes of a resin thin film according to the present embodiment. This production apparatus is an apparatus that performs the steps (2) and (3) out of the steps (1) to (3) of the producing method according to the present invention. FIG. 13 is a perspective view schematically showing a member having a concavo-convex shape usable in the producing method according to the present embodiment. FIG. 14 is a plan view schematically showing the member of FIG. 13 in a state of being cut along line X3-X3 and developed. FIG. 15 is a partial cross-sectional view taken along line Y3-Y3 shown in FIG. 14. FIG. 16 is a plan view schematically showing a multilayer film having cracks formed by the member having a concavo-convex shape. FIG. 17 is a plan view schematically showing a multilayer film having cracks formed by the member having a concavo-convex shape shown in FIG. 13.

Summary of Producing Method According to Present Embodiment

As shown in FIG. 12, an apparatus 100 for producing flakes of a resin thin film used in the present embodiment includes: an unwinding device 101 that unwinds a multilayer film 10; a member 160 having a concavo-convex shape used to press the multilayer film 10 to form cracks; a stripping device 130 that strips a resin thin film from the multilayer film 10; and a substrate film recovery unit 105 that recovers a substrate film 12 from which the resin thin film has been stripped.

As shown in FIG. 2, the multilayer film 10 used in the present embodiment includes a substrate film 12 and a resin thin film 11 formed on the substrate film. In FIG. 12, when the multilayer film 10 unwound from the unwinding device 101 is transferred to the stripping device 130, the surface thereof on the side of the resin thin film 11 faces upward.

The multilayer film 10 unwound from the unwinding device 101 is transferred in a direction A1 by a transfer roll 102 to the member 160 having a concavo-convex shape. The transferred multilayer film 10 is pressed by being sandwiched between the member 160 having a concavo-convex shape and a supporting member 170, so that cracks are formed in the resin thin film 11 (step (2)).

The multilayer film 10 having cracks formed therein is transferred to the stripping device 130. In the stripping device 130, a fluid is sprayed from a nozzle 131 onto an area of the resin thin film 11 where cracks have been formed to blow away the resin thin film 11 having cracks formed therein (flakes 11A) (step (3A)). The resin thin film 11 (flakes 11A) blown away in such a manner is transferred to a collection path 132 and collected (step (3B)). The collected resin thin film 11 (flakes 11A) may be subjected to a pulverizing step depending on the use application (step (3C)).

Member 160 Having Concavo-Convex Shape and Shape of Cracks

The member 160 having a concavo-convex shape and the supporting member 170 used in the step (2) of the present embodiment are cylindrical and can rotationally be moved on the multilayer film 10. The outside surface of the member 160 having a concavo-convex shape has a concavo-convex shape as shown in FIG. 13. As shown in FIG. 14, the concavo-convex shape is a shape in which a projection 160T and a recess 160D, which extend in a direction perpendicular to a direction denoted by L3, are alternately and repeatedly formed in the direction denoted by L3. The distance between the two adjacent projections 160T (distance Q3 between 160T1 and 160T2 shown in FIG. 15) may appropriately be set. In FIG. 13 and FIGS. 14, 161 and 162 denote the edges of the member 160 having a concavo-convex shape.

As shown in FIG. 15, the projections 160T have a mound-shaped cross section having a sharply-angled tip 160T1. In FIG. 15, θ3 is the angle of the tips of the projections 160T. The angle θ3 is preferably small, and may be, for example, 10° to 90°. In the enlarged view of a Z3 portion shown in FIG. 15, R3 denotes a radius of a circle (circle having a center P3) inscribed in a tip portion of the projection. The radius R3 is preferably small, and may be, for example, 1 μm or less. The radius R3 may be measured by, for example, a microscope or a laser microscope. The shape of the tips of the projections 160T may be a rounded shape or a beveled shape as long as cracks can be formed in the resin thin film. The particle size distribution of the flakes can be controlled by adjusting the distance Q3 between the adjacent projections of the member 160 having a concavo-convex shape, the angle θ3 of the tips of the projections, and the radius R3.

The material of the member 160 having a concavo-convex shape and the material of the supporting member 170 may be the same as the material of the members 110 and 115 having a concavo-convex shape used in the first embodiment.

By performing the step (2), the shape of the cracks 10C formed in the resin thin film 11 of the multilayer film 10 reflects the shape of the projections of the member 160 having a concavo-convex shape. For example, when the member 160 having a concavo-convex shape, whose developed shape is shown in FIG. 14, is disposed so that the direction L3 shown in FIG. 14 is parallel to the lengthwise direction of the multilayer film to press the multilayer film, cracks can be formed which are parallel to the lengthwise direction of the multilayer film 10 (i.e., a vertical direction in the drawing) as shown in FIG. 16. When the member 160 having a concavo-convex shape, whose developed shape is shown in FIG. 14, is disposed so that the direction L3 shown in FIG. 14 is parallel to the lengthwise direction of the multilayer film to press the multilayer film, and is then disposed so that the direction L3 is parallel to the width direction of the multilayer film to press the multilayer film, cracks 10C can be formed in a grid pattern as shown in FIG. 17.

Action and Effect of Present Embodiment

Also in the present embodiment, as in the case of the first embodiment, the resin thin film is stripped from the substrate film after cracks are formed, and cracks are formed in the resin thin film by pressing the multilayer film with the member having a concavo-convex shape. Therefore, it is possible to provide a producing method capable of efficiently producing flakes having a sharper particle size distribution than those in prior art.

Another Embodiment (1) The aforementioned embodiments have shown examples including a step (3A) of spraying a fluid onto the multilayer film having cracks formed therein to blow away the resin thin film having cracks, a step (3B) of collecting the blown resin thin film, and a step (3C) of pulverizing the collected resin thin film. However, the present invention also includes a producing method not including these steps. For example, because in the present invention cracks are formed in a resin thin film by pressing the multilayer film with a member(s) having a concavo-convex shape, the cracks can be made in a regular shape and flakes having a sharp particle size distribution can be obtained even when the step (3C) of pulverizing the collected resin thin film is omitted.

Figure 18:
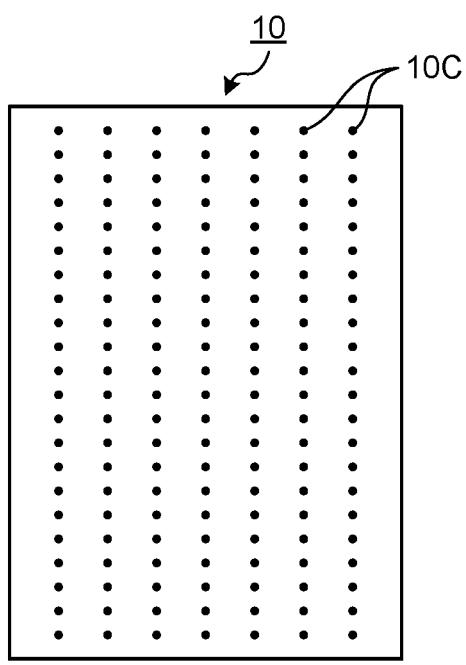
FIG. 18 is a plan view schematically showing a multilayer film having cracks formed by a member having a concavo-convex shape described in another embodiment.

(2) In the aforementioned embodiment, the member 110 having a concavo-convex shape is used to form straight cracks extending in the lengthwise direction or cracks having a grid pattern, but the shape of cracks is not limited thereto. For example, the cracks may be dot shaped cracks 10C as shown in FIG. 18. Since the shape of cracks reflects the concavo-convex shape of the member having a concavo-convex shape, the cracks shown in FIG. 18 can be formed by using a member having a concavo-convex shape in which projections are scattered.

(3) In the foregoing embodiments, examples of using cylindrical members 110, 115, and 160 having a concavo-convex shape have been shown. Instead of the members 110, 115, and 160 having a concavo-convex shape, members having a concavo-convex shape shown in the following modified examples may be used.

First Modified Example

Figure 19:
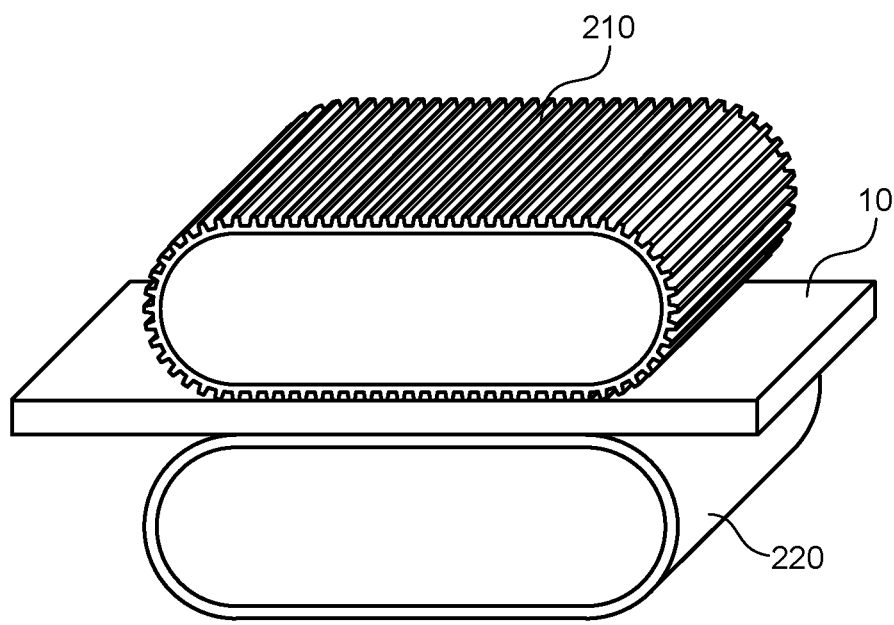
FIG. 19 is a perspective view schematically showing a member having a concavo-convex shape of a first modified example.

FIG. 19 is a perspective view schematically showing a member having a concavo-convex shape used in a first modified example. A member 210 having a concavo-convex shape of the first modified example is elliptically cylindrical. A supporting member 220 disposed on the opposite side of the multilayer film 10 from the member 210 having a concavo-convex shape is also elliptically cylindrical. When the member 210 having a concavo-convex shape of the present example is used, cracks can be formed in the resin thin film by pressing the multilayer film 10 sandwiched between the member 210 having a concavo-convex shape and the supporting member 220.

Second Modified Example

Figure 20:
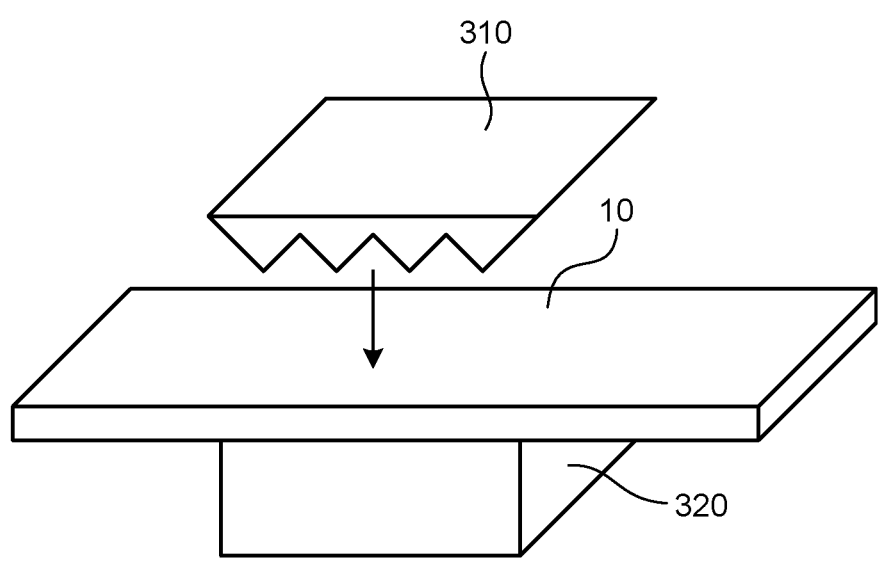
FIG. 20 is a perspective view schematically showing a member having a concavo-convex shape of a second modified example.

FIG. 20 is a perspective view schematically showing a member having a concavo-convex shape used in a second modified example. A member 310 having a concavo-convex shape of the second modified example has a plate shape as a whole. A surface of the member 310 having a concavo-convex shape on a side in contact with the multilayer film 10 (lower surface shown in the drawing) has a concavo-convex shape, and the opposite surface (upper surface in the drawing) has a flat surface. A supporting member 320 disposed on the opposite side of the multilayer film 10 from the member 310 having a concavo-convex shape has a flat plate shape. When the member 310 having a concavo-convex shape of the present example is used, cracks can be formed in the resin thin film by pressing the multilayer film 10 sandwiched between the member 310 having the concavo-convex shape and the supporting member 320.

Examples

Hereinafter, the present invention will be specifically described by illustrating examples. However, the present invention is not limited to the examples described below.

In the following description, "." and "part" representing quantity are on the basis of weight, unless otherwise specified. The operation described below was performed under the conditions of normal temperature and normal pressure unless otherwise specified.

[Description of reagent]

The reagents used in the following examples are as follows.

As the photopolymerizable liquid crystal compound 1, a compound having the following structure was used.

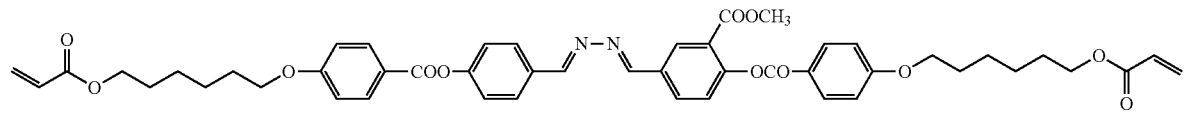

Photopolymerizable liquid crystal compound 1

As the photopolymerizable liquid crystal compound 2, a compound having the following structure was used.

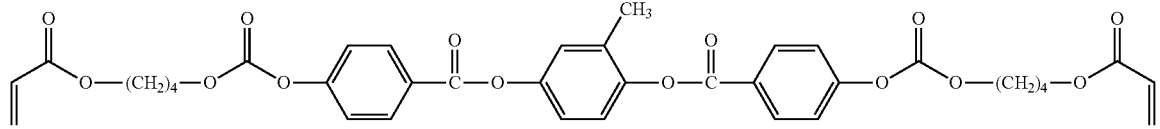

Photopolymerizable liquid crystal compound 2

As the photopolymerizable non-liquid crystal compound, a compound having the following structure was used.

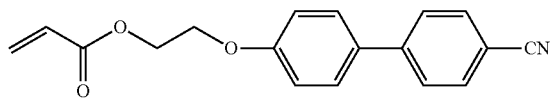

Photopolymerizable non-liquid crystal compound

As the chiral agent, "LC756" manufactured by BASF Corp. was used.

As the photopolymerization initiator, "Irgacure OXE2" manufactured by Ciba Japan Co., Ltd. was used.

As the surfactant, "Ftergent 209F" produced by NEOS Co., Ltd. was used.

[Evaluation Methods]
[Description of Evaluation Methods]
(Method for Measuring Peel Strength of Resin Thin Film from Substrate Film)

A glass plate (size: 25 mm wide×100 mm long, thickness: 2 mm) was prepared. A tackiness sheet ("LUCIACS CS9621T" produced by Nitto Denko Corporation, thickness: 25 μm) was cut to have the same size as that of the glass plate. This tackiness sheet was a film having a three-layer structure including a release liner as a protective film, a tackiness agent layer, and a release liner in this order.

One of the release liners of the tackiness sheet was peeled off to expose the surface of the tackiness agent layer. The exposed surface of the tackiness agent layer was bonded to the glass plate using a roller with a load of 1 kg.

The other release liner of the tackiness sheet was peeled off to expose the surface of the tackiness agent layer. The exposed surface of the tackiness agent layer was bonded to the surface of a multilayer film including a substrate film and a resin thin film on the resin thin film side using a roller with a load of 1 kg. After that, a portion of the multilayer film protruding from the glass plate was cut off. As a result, a sample including the glass plate, the tackiness agent layer, the resin thin film, and the substrate film in this order was obtained.

The sample was nipped and fixed with a jig of a tensile tester ("MX-500N-L550-E" manufactured by IMADA Co., Ltd.). The substrate film of the sample was pulled in a direction of 90° (i.e., in the direction normal to the surface of the glass plate) in accordance with JIS K6854-1, thereby peeling off the substrate film from the resin thin film to measure peel strength of the resin thin film. The measurement was performed using a load cell with a maximum load of 5 N. The tensile speed at the time of measurement was 20 mm/min.

(Method for Measuring Particle Size Distribution of Flakes of Resin Thin Film)

The particle size distribution of flakes of a resin thin film obtained in each example was measured using a flow particle image analyzer (FPIA-3000) manufactured by Sysmex Corporation and evaluated in accordance with the following criteria.

[Evaluation Criteria of Particle Size Distribution of Resin Thin Film]

The particle size distribution of flakes obtained in each example was compared with that of flakes obtained in Comparative Example 1 and evaluated in accordance with the following criteria.

"Good": The particle size distribution is shaper than that of flakes of Comparative Example 1.

"Poor": The particle size distribution is not shaper than that of flakes of Comparative Example 1 or equal to that of flakes of Comparative Example 1.

Example 1

(1-1. Preparation of Photocurable Liquid Crystal Composition)

A photocurable liquid crystal composition was prepared by mixing the photopolymerizable liquid crystal compound 1, the photopolymerizable non-liquid crystal compound, the chiral agent, the photopolymerization initiator, the surfactant, and cyclopentanone in the proportions shown in Table 1.

(1-2. Production of Long-Length Multilayer Film)

As a substrate film, a long-length polyethylene terephthalate film having an isotropic in-plane refractive index ("PET film A4100" manufactured by Toyobo Co., Ltd.; thickness 100 μm) was prepared. This substrate film was loaded onto an unwinding unit of a film transfer apparatus, and the following operations were performed while the substrate film was transferred in its lengthwise direction. First, the substrate film was subjected to a rubbing treatment in a lengthwise direction parallel to a transfer direction. Then, the liquid crystal composition prepared in (1-1) was applied onto the surface of the substrate film, which had been subjected to the rubbing treatment, with a die coater. As a result, a film of the liquid crystal composition in an uncured state was formed on one surface of the substrate film.

The obtained film of the liquid crystal composition was subjected to an orientation treatment at 100° C. for 5 minutes, and the process of irradiation with weak ultraviolet rays at a dose of 0.1 mJ/cm$^2$ to 45 mJ/cm$^2$ and subsequent warming at 100° C. for 1 minute was repeatedly performed twice on the film. Then, the film of the liquid crystal composition was irradiated with ultraviolet rays at a dose of 800 mJ/cm$^2$ in a nitrogen atmosphere to completely cure the film of the liquid crystal composition. As a result, a multilayer film was obtained in which a resin thin film having a thickness shown in Table 1 was provided on one surface of the long-length substrate film. The obtained multilayer film was subjected to measurement for the peel strength of the resin thin film from the substrate film by the aforementioned method.

(1-3. Production of Flakes of Resin Thin Film)

An apparatus 100 shown in FIG. 1 including an unwinding device 101, members 110 and 115 having a concavo-convex shape, and a stripping device 130 was prepared. The stripping device 130 was equipped with a nozzle 131 capable of spraying air onto the multilayer film after pressing by the members 110 and 115 having a concavo-convex shape.

The multilayer film 10 produced in (1-2) was loaded onto the unwinding device 101 so that the resin thin film 11 faced upward to send the multilayer film 10. The multilayer film 10 was vertically pressed in by being sandwiched between the member 110 having a concavo-convex shape and a supporting member 120, and was then further vertically pressed by being sandwiched between the member 115 having a concavo-convex shape and a supporting member 125. As the members 110 and 115 having a concavo-convex shape, members were used in which radii R1 and R2 in the tip portions of projections were each 0.9 μm, distances Q1 and Q2 between the projections were each 100 μm, and θx and θy were each 45°. A pressing pressure applied by the members 110 and 115 having a concavo-convex shape was set to 30 MPa.

By pressing with the member 110 having a concavo-convex shape, straight cracks tilted by 45° with respect to the width direction of the multilayer film 10 were formed on the surface of the multilayer film 10 on the side where the thin film 11 was formed. Then, by further pressing with the member 115 having a concavo-convex shape, straight cracks were formed in a direction perpendicular to the straight cracks formed by the member 110 having a concavo-convex shape. As a result, cracks were formed in a grid pattern (see FIG. 10). In the grid pattern of cracks, a plurality of rectangles were regularly arranged. After the pressing, there was almost no resin thin film filled in recesses of the members 110 and 115 having a concavo-convex shape.

Then, the multilayer film 10 was transferred to the nozzle 131 to spray air from the nozzle 131. The pressure of air sprayed from the nozzle 131 was set to 0.5 MPa. By spraying air onto the multilayer film 10, the resin thin film 11 having cracks formed therein was stripped, so that flakes 11A were obtained.

The obtained flakes 11A of the resin thin film 11 were collected by a collector (all-polypropylene filter manufactured by 3M), and the particle size distribution thereof was measured and evaluated by the aforementioned methods.

Example 2

Flakes were produced, and the particle size distribution of the obtained flakes was measured and evaluated, by the same manner as that of Example 1 except that, in (1-3) of Example 1, as the members 110 and 115 having a concavo-convex shape, members in which radii R1 and R2 in the tip portions of projections were each 0.9 μm, distances Q1 and Q2 between the projections were each 50 μm, and θx and θy were each 45 were used and that a pressing pressure applied by the members 110 and 115 having a concavo-convex shape was set to 50 MPa.

Also in the present example, as in the case of Example 1, cracks were formed in a grid pattern as shown in FIG. 10 on the surface of the multilayer film 10 on the side where the resin thin film 11 was provided by pressing with the member 110 having a concavo-convex shape and then by pressing with the member 115 having a concavo-convex shape. In the grid pattern of cracks, a plurality of rectangles were regularly arranged. In the present example, after the pressing, there was almost no resin thin film filled in recesses of the members 110 and 115 having a concavo-convex shape.

Example 3

Flakes were produced, and the particle size distribution of the obtained flakes was measured and evaluated, by the same manner as that of Example 1 except that, in (1-3) of Example 1, a pressing pressure applied by the members 110 and 115 having a concavo-convex shape was set to 120 MPa.

Also in the present example, as in the case of Example 1, cracks were formed in a grid pattern as shown in FIG. 10 on the surface of the multilayer film 10 on the side where the resin thin film 11 was provided by pressing with the member 110 having a concavo-convex shape and then by pressing with the member 115 having a concavo-convex shape. In the grid pattern of cracks, a plurality of rectangles were regularly arranged. After the pressing, some of recesses of the members 110 and 115 having a concavo-convex shape were filled with the resin thin film, but cracks were formed without problem.

Example 4

(4-1. Preparation of Photocurable Liquid Crystal Composition)

A photocurable liquid crystal composition was prepared by mixing the photopolymerizable liquid crystal compound 2, the photopolymerizable non-liquid crystal compound, the chiral agent, the photopolymerization initiator, the surfactant, and cyclopentanone in the proportions shown in Table 1.

(4-2. Production of Long-Length Multilayer Film)

A long-length multilayer film was obtained by the same manner as that of (1-2) of Example 1 except that, in (1-2) of Example 1, the photocurable liquid crystal composition prepared above in (4-1) was used instead of the liquid crystal composition prepared in (1-1) of Example 1 and that the thickness of the resin thin film was set to 5.2 μm. The obtained multilayer film was subjected to measurement for the peel strength of the resin thin film from the substrate film by the aforementioned method.

(4-3. Production of Flakes of Resin Thin Film)

Flakes were produced, and the particle size distribution of the obtained flakes was measured and evaluated, by the same manner as that of Example 1 except that, in (1-3) of Example 1, the multilayer film produced in (4-2) was used instead of the multilayer film produced in (1-2) and that a pressing pressure applied by the members 110 and 115 having a concavo-convex shape was set to 70 MPa.

Also in the present example, as in the case of Example 1, cracks were formed in a grid pattern as shown in FIG. 10 on the surface of the multilayer film 10 on the side where the resin thin film 11 was provided by pressing with the member 110 having a concavo-convex shape and then by pressing with the member 115 having a concavo-convex shape. In the grid pattern of cracks, a plurality of rectangles were regularly arranged. After the pressing, there was almost no resin thin film filled in recesses of the members 110 and 115 having a concavo-convex shape.

Comparative Example 1

Figure 21:
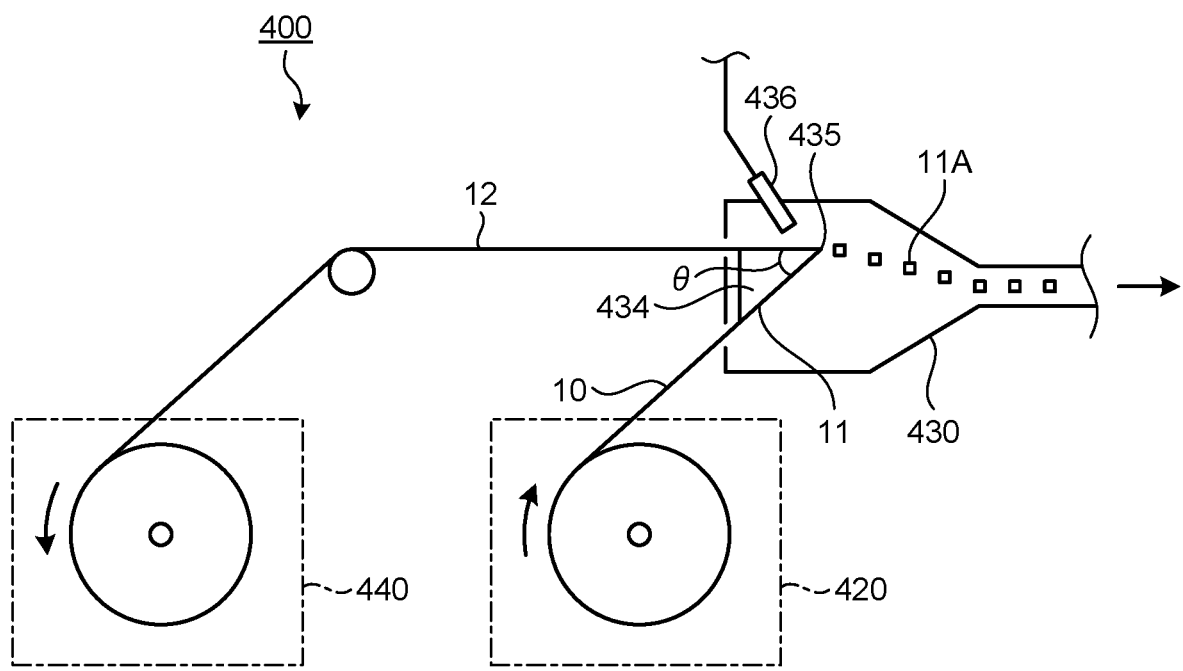
FIG. 21 is a side view schematically showing a producing apparatus for flakes used in Comparative Example 1.

Flakes of a resin thin film were produced by the following method using the multilayer film produced in (1-2) of Example 1 and a production apparatus shown in FIG. 21. The obtained flakes were used as a standard for comparison to evaluate the particle size distribution of the flakes of Example.

(Production of Flakes of Resin Thins Film)

FIG. 21 is a side view schematically showing a flake production apparatus used in Comparative Example 1. A production apparatus 400 as shown in FIG. 21 including a film sending unit 420, a stripping unit 430, and a film recovery unit 440 was prepared. The stripping unit 430 was equipped with a bar 434 having a sharply-angled corner 435 and a nozzle 436 capable of spraying air provided just downstream from the corner 435. In this case, the angle of the corner 435 of the bar 434 was set so that the multilayer film 10 was folded at an angle θ (60°). The corner has a beveled structure in which R=0.2 mm to 0.3 mm.

The multilayer film 10 was loaded onto the film sending unit 420 so that the resin thin film 11 was located on the outside of the substrate film 12 when the multilayer film 10 was folded at the corner 435 of the bar 434. Then, the multilayer film 10 was sent from the film sending unit 420 in a state where tension was applied to the multilayer film 10 in a transfer direction by the film recovery unit 440. At this time, the tension applied to the multilayer film 10 was set to 80 N/m. Further, air was sprayed from the nozzle 436 at a pressure of 0.5 MPa.

The multilayer film 10 was folded at the corner 435 of the bar 434, so that many cracks were formed. Then, the resin thin film 11 having cracks formed therein was stripped and blown away by air sprayed from the nozzle 436 to obtain flakes 11A. The particle size distribution of the obtained flakes was measured.

The evaluation results of the foregoing Examples and Comparative Example were shown in the following Table 1.

TABLE 1

| | Ex. 1 | Ex. 2 | Ex. 3 | Ex. 4 | Comp. Ex. 1 |
|---|---|---|---|---|---|
| Photopolymerizable liquid crystal compound 1 (parts) | 29.1 | 29.1 | 29.1 | — | 29.1 |
| Photopolymerizable liquid crystal compound 2 (parts) | — | — | — | 30.5 | — |
| Photopolymerizable non-liquid crystal compound (parts) | 7.3 | 7.3 | 7.3 | 5.8 | 7.3 |
| Chiral agent (parts) | 2.4 | 2.4 | 2.4 | 2.5 | 2.4 |
| Photopolymerization initiator (parts) | 1.2 | 1.2 | 1.2 | 1.2 | 1.2 |
| Surfactant (parts) | 0.04 | 0.04 | 0.04 | 0.04 | 0.04 |
| Cyclopentanone (parts) | 60 | 60 | 60 | 60 | 60 |
| Substrate film | PET | PET | PET | PET | PET |
| Film thickness of resin thin film (μm) | 4.7 | 4.7 | 4.7 | 5.2 | 4.7 |
| Peel strength (N/m) | 4.5 | 4.5 | 4.5 | 4.8 | 4.5 |
| Crack shape formed by the member having concavo-convex shape | Grid | Grid | Grid | Grid | — |
| Projection tip portion R1, R2 | 0.9 μm | 0.9 μm | 0.9 μm | 0.9 μm | |
| Distance between projections Q1, Q2 | 100 μm | 50 μm | 100 μm | 100 μm | |
| Pressing pressure (MPa) | 30 | 50 | 120 | 70 | |
| Particle size distribution | Good | Good | Good | Good | — |

[Results]

As shown in Table 1, according to Examples 1 to 3, it was possible to efficiently produce flakes having a sharper particle size distribution.

REFERENCE SIGN LIST 10 multilayer film
10C crack
11 resin thin film
11A flake
12 substrate film
100, 150 apparatus for producing flakes of a resin thin film
101 unwinding device
102, 103 transfer roll
105 substrate film recovery unit
110, 115, 160, 210, 310 member having concavo-convex shape
110D, 115D, 160D recess
110T, 115T, 160T projection
110T1, 110T2, 115T1, 115T2, 160T1, 160T2 tip of the projection
111, 112, 116, 117, 161, 162 edge of the member having concavo-convex shape
120, 125, 170, 220, 320 supporting member
130 stripping device
131 nozzle
132 collection path

The invention claimed is:

1. A method for producing flakes of a resin thin film comprising:
   a step (1) of forming a resin thin film on a substrate film to obtain a multilayer film;
   a step (2) of, after the step (1), forming cracks in a grid pattern in the resin thin film by pressing the multilayer film with a plurality of members each having a concavo-convex shape; and
   a step (3) of, after the step (2), stripping the resin thin film from the substrate film to obtain flakes,
   wherein the resin thin film is a cholesteric resin layer.

2. The method for producing flakes of a resin thin film according to claim 1, wherein the step (2) is performed with a pressing pressure of 100 MPa or less.

3. The method for producing flakes of a resin thin film according to claim 1, wherein the resin thin film is formed of a cured product of a photocurable liquid crystal composition.

4. The method for producing flakes of a resin thin film according to claim 1, wherein
   the step (3) includes:
   a step (3A) of spraying a fluid onto a portion of the resin thin film where the cracks have been formed to blow away the resin thin film having the cracks formed therein;
   a step (3B) of collecting the blown resin thin film; and
   a step (3C) of pulverizing the collected resin thin film.

5. A method for producing flakes of a resin thin film comprising:
   a step (1) of forming a resin thin film on a substrate film to obtain a multilayer film;
   a step (2) of, after the step (1), forming cracks in a grid pattern in the resin thin film by pressing the multilayer film with a plurality of members each having a concavo-convex shape; and
   a step (3) of, after the step (2), stripping the resin thin film from the substrate film to obtain flakes, wherein
   the step (3) includes:
   a step (3A) of spraying a fluid onto a portion of the resin thin film where the cracks have been formed to blow away the resin thin film having the cracks formed therein;
   a step (3B) of collecting the blown resin thin film; and
   a step (3C) of pulverizing the collected resin thin film.

6. The method for producing flakes of a resin thin film according to claim 5, wherein the step (2) is performed with a pressing pressure of 100 MPa or less.

7. The method for producing flakes of a resin thin film according to claim 5, wherein the resin thin film is formed of a cured product of a photocurable liquid crystal composition.

* * * * *